United States Patent
Lee et al.

(10) Patent No.: US 11,876,747 B2
(45) Date of Patent: Jan. 16, 2024

(54) METHOD AND APPARATUS FOR PHYSICAL SIDELINK CONTROL CHANNEL (PSCCH) DESIGN IN NEW RADIO (NR)

(71) Applicant: INTERDIGITAL PATENT HOLDINGS, INC., Wilmington, DE (US)

(72) Inventors: Moon-il Lee, Melville, NY (US); Mahmoud Taherzadeh Boroujeni, San Diego, CA (US); Shahrokh Nayeb Nazar, San Diego, CA (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 553 days.

(21) Appl. No.: 17/266,444

(22) PCT Filed: Aug. 8, 2019

(86) PCT No.: PCT/US2019/045747
§ 371 (c)(1),
(2) Date: Feb. 5, 2021

(87) PCT Pub. No.: WO2020/033719
PCT Pub. Date: Feb. 13, 2020

(65) Prior Publication Data
US 2021/0297221 A1      Sep. 23, 2021

Related U.S. Application Data

(60) Provisional application No. 62/804,992, filed on Feb. 13, 2019, provisional application No. 62/716,089, filed on Aug. 8, 2018.

(51) Int. Cl.
*H04L 5/00*      (2006.01)
*H04L 1/1812*      (2023.01)
(Continued)

(52) U.S. Cl.
CPC .......... *H04L 5/0053* (2013.01); *H04L 1/1812* (2013.01); *H04L 2025/03783* (2013.01); *H04W 72/20* (2023.01); *H04W 92/18* (2013.01)

(58) Field of Classification Search
CPC ......... H04L 5/00; H04L 5/003; H04L 5/0053; H04L 1/16; H04L 1/18; H04L 1/1812;
(Continued)

(56) References Cited

U.S. PATENT DOCUMENTS 9,712,995 B2    7/2017  Seo et al.
2015/0373694 A1* 12/2015  You ...................... H04L 5/0051
                                                 370/329

(Continued)

FOREIGN PATENT DOCUMENTS

EP            3179811 B1    6/2020
WO       2013/155253 A1   10/2013
(Continued)

OTHER PUBLICATIONS

Huawei et al., "Discussion on DM-RS Overhead Reduction," 3GPP TSG RAN WG1 Meeting #89, R1-1707012, Hangzhou, China (May 15-19, 2017).

(Continued)

*Primary Examiner* — Warner Wong
(74) *Attorney, Agent, or Firm* — Volpe Koenig

(57) ABSTRACT

Devices and methods are disclosed for a physical sidelink control channel (PSCCH) design in new radio (NR). A wireless transmit receive unit (WTRU) for sidelink communication may receive a resource pool identity (ID). Further, the WTRU may determine whether to include information related to demodulation reference signal (DM-RS) density for a sidelink transmission in sidelink control information (SCI) based on the resource pool ID. On a condition that the information related to DM-RS density is to be included in (Continued)

the SCI, the WTRU may transmit the SCI including the information related to DM-RS density. Also, the SCI may be associated with a PSSCH. Accordingly, the WTRU may transmit the sidelink transmission on the PSSCH with one or more DM-RSs at a first DM-RS density based on the information related to DM-RS density.

20 Claims, 10 Drawing Sheets

(51) Int. Cl.
  *H04W 92/18* (2009.01)
  *H04W 72/20* (2023.01)
  *H04L 25/03* (2006.01)

(58) Field of Classification Search
  CPC .......... H04L 1/0047; H04L 1/0091; H04L 12/40071; H04L 27/261; H04L 27/2613; H04L 2025/03783; H04L 2027/0083; H04L 2027/0087; H04W 92/00; H04W 92/16; H04W 92/18; H04W 4/20; H04W 72/20
  See application file for complete search history.

(56) References Cited

U.S. PATENT DOCUMENTS

| | | | |
|---|---|---|---|
| 2016/0211959 A1* | 7/2016 | Jöngren | H04W 24/08 |
| 2017/0078006 A1* | 3/2017 | Liu | H04L 27/2613 |
| 2017/0187499 A1* | 6/2017 | Hwang | H04L 5/0051 |
| 2017/0188391 A1 | 6/2017 | Rajagopal et al. | |
| 2017/0237590 A1* | 8/2017 | Zhang | H04B 7/0452 370/330 |
| 2017/0366328 A1 | 12/2017 | Seo et al. | |
| 2019/0052527 A1* | 2/2019 | Ghosh | H04L 25/0224 |
| 2019/0097782 A1* | 3/2019 | Horiuchi | H04L 27/2646 |
| 2019/0123864 A1* | 4/2019 | Zhang | H04L 5/005 |
| 2019/0141675 A1* | 5/2019 | Blasco Serrano | H04L 5/0051 |
| 2019/0260454 A1* | 8/2019 | Lindbom | H04L 5/0016 |
| 2019/0268904 A1* | 8/2019 | Miao | H04W 52/02 |
| 2019/0342865 A1* | 11/2019 | Shin | H04L 1/1819 |
| 2020/0204335 A1* | 6/2020 | Kim | H04L 27/2646 |
| 2020/0220702 A1* | 7/2020 | Sun | H04W 72/0446 |
| 2020/0235874 A1* | 7/2020 | Yeo | H04W 72/04 |
| 2020/0328861 A1* | 10/2020 | Malladi | H04L 5/0069 |
| 2021/0028913 A1* | 1/2021 | Peng | H04L 1/00 |
| 2021/0091841 A1* | 3/2021 | Lindbom | H04L 5/0016 |
| 2022/0014331 A1* | 1/2022 | Peng | H04L 25/03866 |
| 2022/0038248 A1* | 2/2022 | Horiuchi | H04L 5/0033 |
| 2022/0046562 A1* | 2/2022 | Yuan | H04W 56/001 |
| 2022/0279525 A1* | 9/2022 | Zhao | H04W 72/0453 |
| 2022/0312388 A1* | 9/2022 | Zhao | H04W 72/1263 |
| 2023/0012639 A1* | 1/2023 | Fu | H04L 27/26025 |
| 2023/0047328 A1* | 2/2023 | Wang | H04L 5/005 |

FOREIGN PATENT DOCUMENTS

| | | | | |
|---|---|---|---|---|
| WO | 2018/031172 A1 | 2/2018 | | |
| WO | WO-2020089870 A1 * | 5/2020 | ........ | H04W 4/46 |
| WO | WO-2020222896 A1 * | 11/2020 | ........ | H04L 5/00 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
OPPO, "Transmit diversity scheme in eV2X," 3GPP TSG RAN WG1 Meeting #91, R1-1719979, Reno, USA (Nov. 27-Dec. 1, 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.2.0 (Jul. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.6.0 (Jun. 2019).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.0 (Jun. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.2 (Jun. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.6.0 (Jun. 2019).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Physical layer procedures for data (Release 15)," 3GPP TS 38.214 V15.2.0 (Jun. 2018).
Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.2.1 (Jun. 2018).
Third Generation Partnership Project, "Technical Specification Group Radio Access Network; NR; Radio Resource Control (RRC) protocol specification (Release 15)," 3GPP TS 38.331 V15.6.0 (Jun. 2019).

(56) References Cited

OTHER PUBLICATIONS

Third Generation Partnership Project, "Technical Specification Group Radio Access Network; NR; Physical channels and modulation (Release 15)," 3GPP TS 38.211 V15.2.0 (Jun. 2018).

Third Generation Partnership Project, "Technical Specification Group Radio Access Network; NR; Physical channels and modulation (Release 15)," 3GPP TS 38.211 V15.6.0 (Jun. 2019).

Guangdong Oppo Mobile Telecom, "Transmit diversity scheme in eV2X," 3GPP TSG RAN WG1 Meeting #90, R1-1713249, Prague, P.R. Czechia (Aug. 21-25, 2017).

Wilus Inc., "Discussion on HARQ Combining for UL transmission without grant," 3GPP TSG RAN WG1 Meeting #90, R1-1714393, Prague, P.R. Czechia (Aug. 21-25, 2017).

\* cited by examiner

METHOD AND APPARATUS FOR PHYSICAL SIDELINK CONTROL CHANNEL (PSCCH) DESIGN IN NEW RADIO (NR)

CROSS-REFERENCE TO RELATED APPLICATIONS

This application is the U.S. National Stage, under 35 U.S.C. § 371, of International Application No. PCT/US2019/045747 filed Aug. 8, 2019, which claims the benefit of U.S. Provisional Application No. 62/716,089, filed Aug. 8, 2018, and U.S. Provisional Application No. 62/804,992, filed Feb. 13, 2019, the contents of which are incorporated herein by reference.

BACKGROUND

In 3rd Generation Partnership Project (3GPP) New Radio (NR) wireless communications, a Uu interface may be designed to support communication between a next generation NodeB, such as a gNode B (gNB), and one or more user equipments (UEs) or wireless transmit/receive units (WTRUs). The designs of NR may support several services based on data transmission between a gNB and one or more WTRUs.

Vehicle-to-everything (V2X) communications architecture has been developed for wireless communication systems, including those which use an evolved packet core (EPC). V2X communications may include one or more of vehicle-to-vehicle (V2V) communications, vehicle-to-pedestrian (V2P) communications, vehicle-to-infrastructure (V2I) communications and vehicle-to-network (V2N) communications.

However, WTRU-to-WTRU communication designs, such as communication over a PC5 interface, for device-to-device (D2D) or V2X communication has not been supported in NR. Although 3GPP Long Term Evolution (LTE) has supported WTRU-to-WTRU communication for public safety use cases, V2X use cases, or both use cases, an LTE-based solution may not be compatible in an NR network. Further, use cases such as vehicles platooning, extended sensors, advanced driving, and remote driving may be introduced.

SUMMARY

Devices and methods are disclosed for a physical sidelink control channel (PSCCH) design in new radio (NR). In an example, a source wireless transmit receive unit (WTRU) for sidelink communication may determine whether hybrid automatic repeat request (HARQ) feedback is enabled. On a condition that HARQ feedback is enabled, the source WTRU may determine a demodulation reference signal (DM-RS) density for a sidelink transmission based on HARQ parameters and association information. Further, the association information may include information regarding an association between configured DM-RS time densities and the HARQ parameters. Accordingly, the source WTRU may transmit the sidelink transmission with one or more DM-RSs at the determined DM-RS density.

In a further example, on a condition that HARQ feedback is disabled, the source WTRU may determine the DM-RS density based on a DM-RS density indicator field. Moreover, the DM-RS density indicator field may be received by the source WTRU in associated sidelink control information (SCI).

In another example, the association information may be received by the source WTRU. Further, the association information may be received via a radio resource control (RRC) message. In addition, the association information may be received in associated SCI. In a further example, the association information may be predetermined.

In an additional example, the HARQ parameters may include one or more of a redundancy version number, a new data indicator (NDI) bit toggle status, a HARQ retransmission number or a HARQ process number. Further, the HARQ parameters may be received in associated SCI.

In a further example, a WTRU for sidelink communication may receive a resource pool identity (ID). Further, the WTRU may determine whether to include information related to DM-RS density for a sidelink transmission in SCI based on the resource pool ID. On a condition that the information related to DM-RS density is to be included in the SCI, the WTRU may transmit the SCI including the information related to DM-RS density. Also, the SCI may be associated with a PSSCH. Accordingly, the WTRU may transmit the sidelink transmission on the PSSCH with one or more DM-RSs at a first DM-RS density based on the information related to DM-RS density.

In a further example, the information related to DM-RS density may indicate a number of symbols used for the one or more DM-RSs. Also, the information related to DM-RS density may include a DM-RS density indicator field. In addition, the SCI may be transmitted via an RRC message. Further, the information related to DM-RS density may include a time DM-RS density. Moreover, the information related to DM-RS density may be predetermined.

Additionally, on a condition that HARQ is enabled, the WTRU may determine a second DM-RS density. In examples, the second DM-RS density may be associated with HARQ parameters. Further, the HARQ parameters may include one or more of a redundancy version number, a new data indicator (NDI) bit toggle status, a HARQ retransmission number or a HARQ process number. Also, the HARQ parameters may be received in associated SCI.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
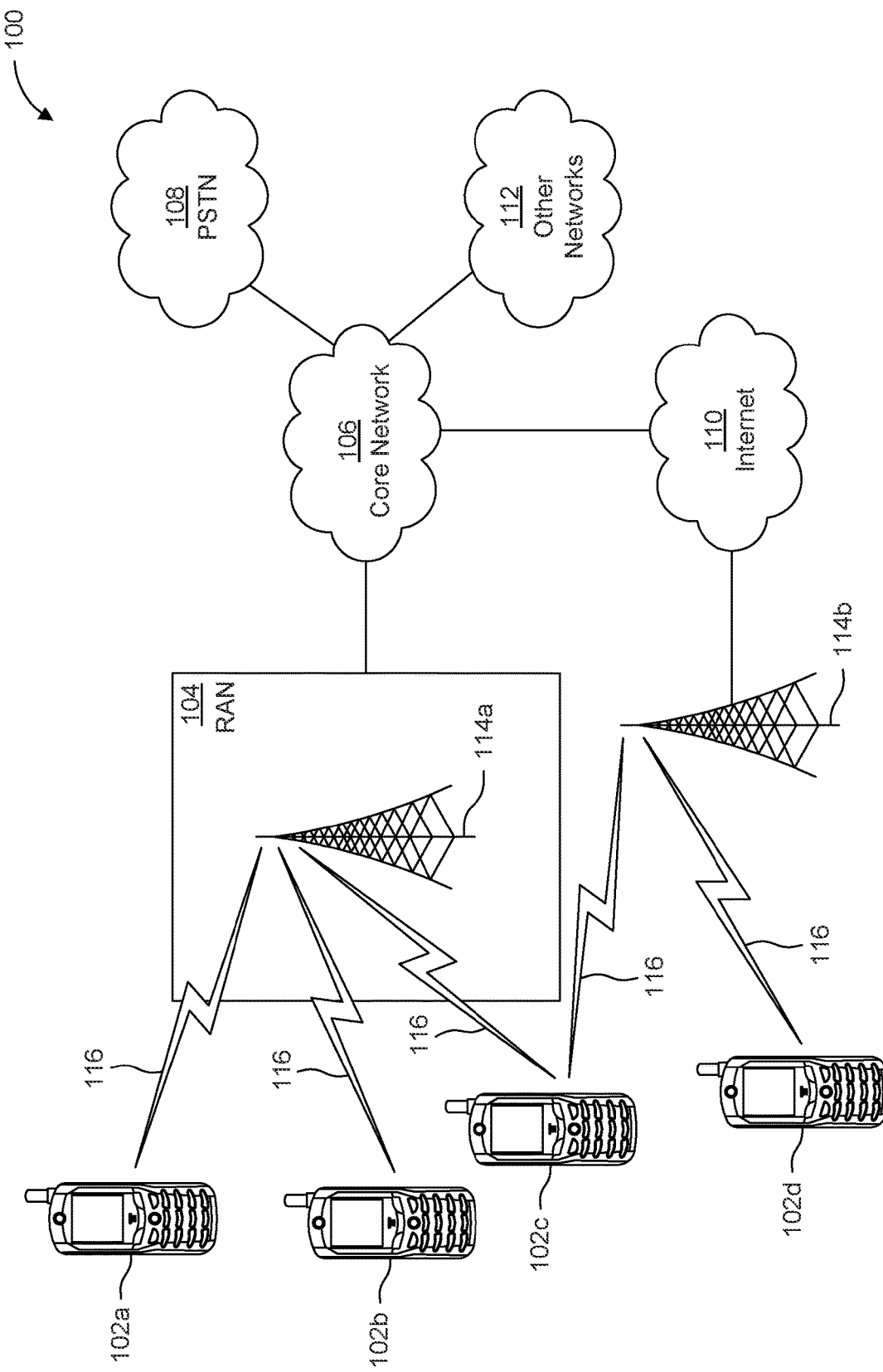
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT-UW-DFT-S-OFDM), unique word OFDM (UW-OFDM), resource block-filtered OFDM, filter bank multi-carrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
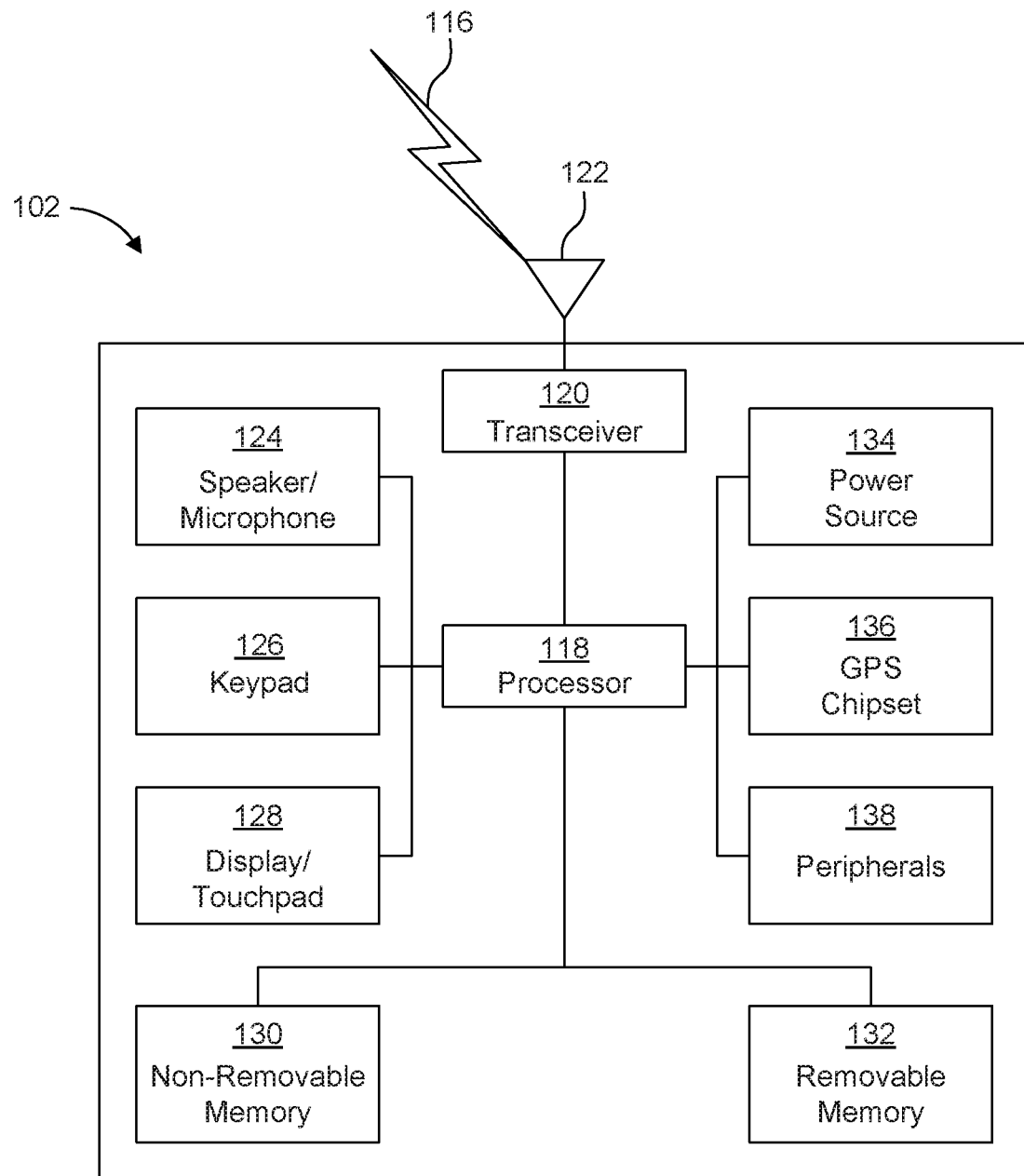
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception)).

Figure 1C:
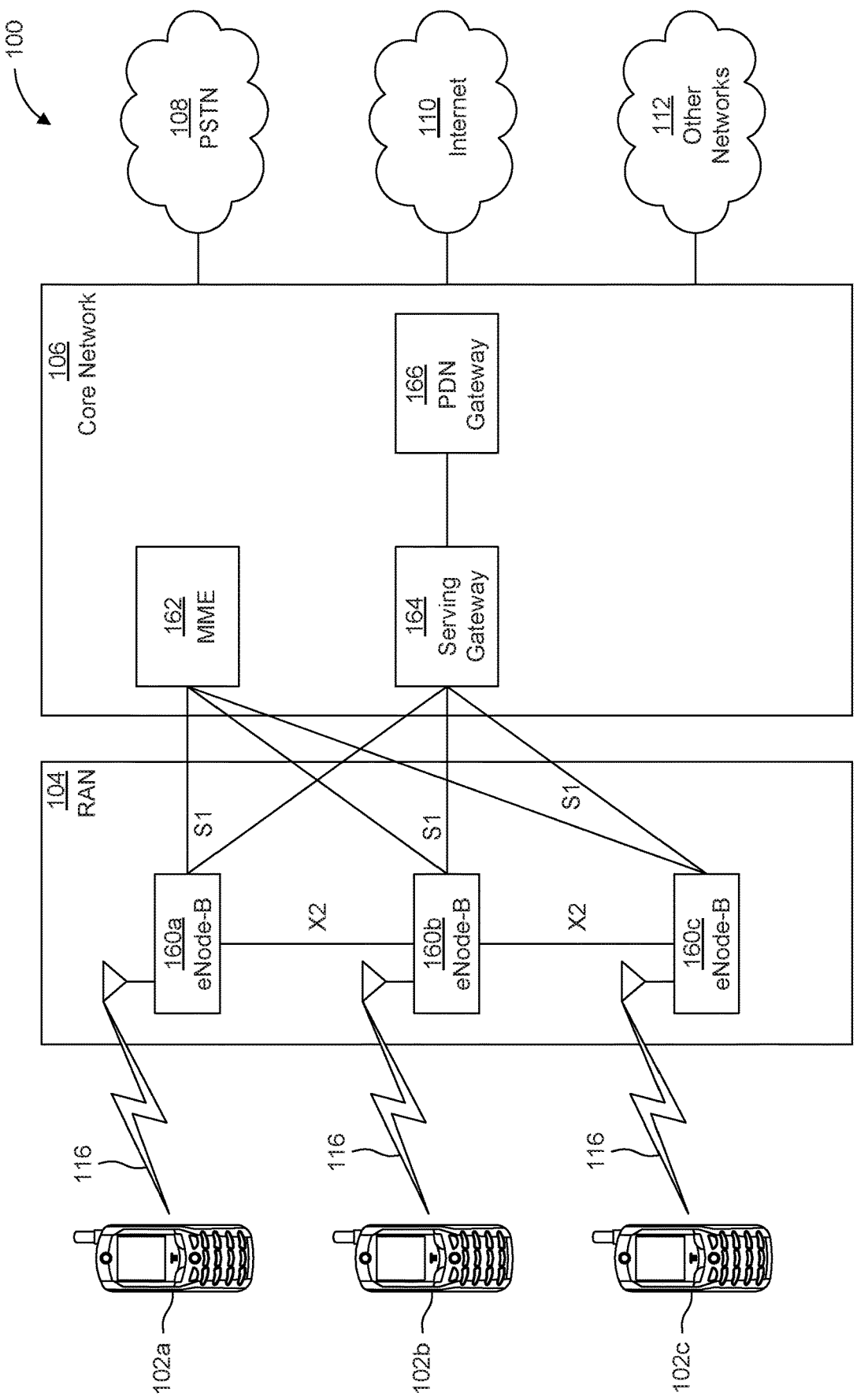
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1O, the eNode-Bs 160a, 160b, 160c may communicate with one another over an X2 interface.

The CN 106 shown in FIG. 1O may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (for example, 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
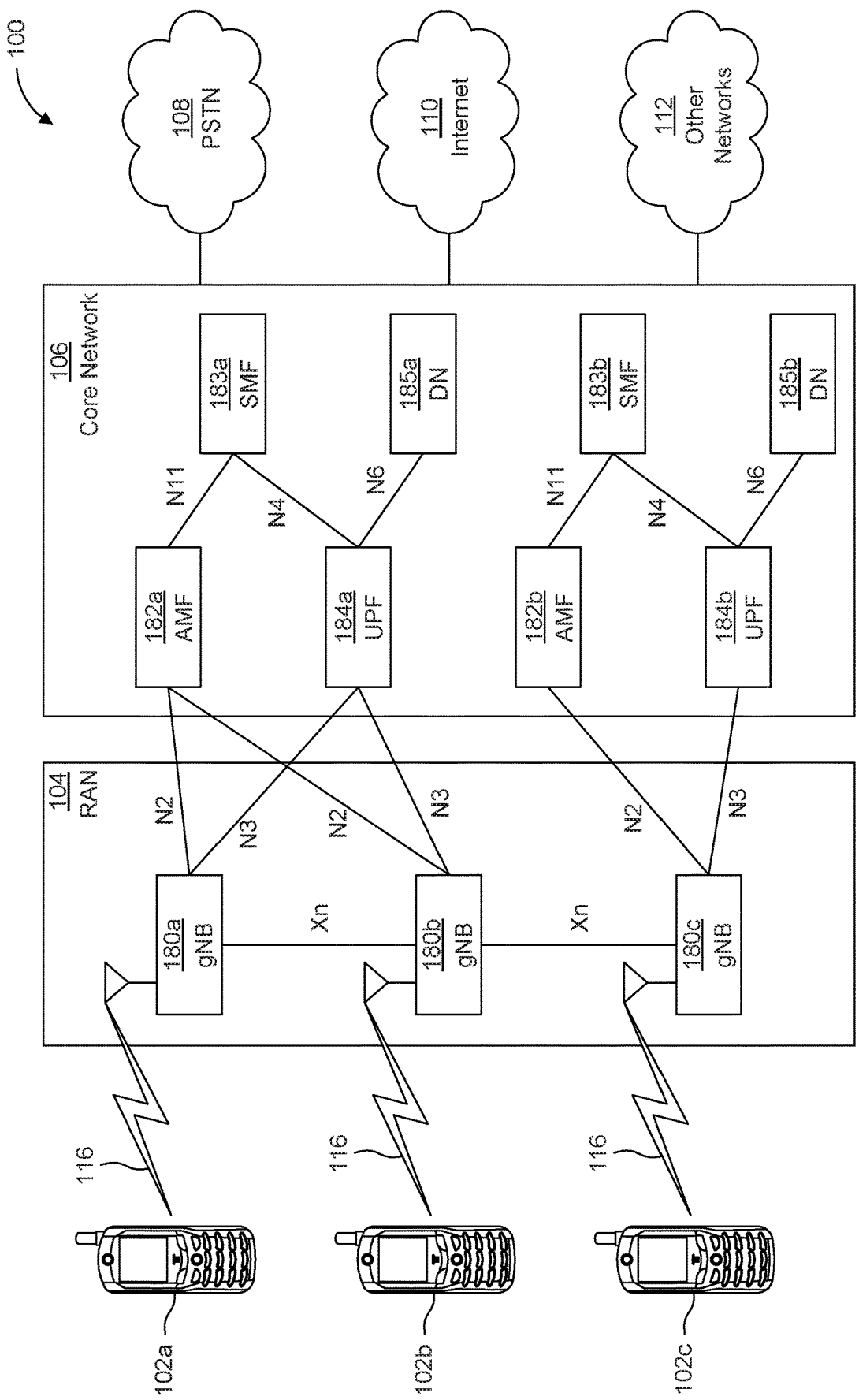
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (for example, containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3rd Generation Partnership Project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

In 3GPP NR wireless communications, a Uu interface may be designed to support communication between a gNB and one or more WTRUs. The designs of NR may support several services based on data transmissions between a gNB and one or more WTRUs. For example, Release 15 in NR may support such services. However, WTRU-to-WTRU communication, such as communication over a PC5 interface, for device-to-device (D2D) or vehicle-to-everything (V2X) communication has not been supported in NR.

Although 3GPP LTE has supported WTRU-to-WTRU communication for public safety use cases, V2X use cases, or both use cases, an LTE-based solution may not be compatible in an NR network. Therefore, a PC5 interface which is based on an NR frame structure and channels may be required. Further, use cases such as vehicles platooning, extended sensors, advanced driving, and remote driving may be introduced and may entail additional requirements for V2X communication.

LTE sidelink communication may be supported for D2D and V2X. The physical channels used for sidelink communication may include a sidelink primary synchronization signal (SPSS), a sidelink secondary synchronization signal (SSSS), a physical sidelink broadcasting channel (PSBCH), a physical sidelink control channel (PSCCH), a physical sidelink shared channel (PSBCH), and a physical sidelink discovery channel (PSDCH).

Sidelink communication may support up to four modes, in an example. For example, sidelink communication may use Modes 1 through 4. In an example, Mode 1 and Mode 2 may be designed for D2D communication which may require power efficient reliable transmission while being delay tolerant and involving low mobility of the devices in sidelink communication with each other. Mode 1 may be based on eNB scheduling for sidelink transmission, where the resource for a sidelink transmission may be scheduled by an eNB via a downlink control information (DCI) message. Mode 2 may be based on WTRU autonomous resource selection within a resource pool. Mode 1 may be used when WTRUs for sidelink transmission are located under eNB coverage so that the WTRUs may be able to receive a control signal from the eNB. In examples, Mode 2 may be used for a case when one or more WTRUs for sidelink transmission are out of the eNB coverage and also for an in coverage case.

Mode 3 and 4 may be introduced for V2X communication to support high mobility of devices as well as low latency compared with Mode 1 and Mode 2. According to an example, in Mode 1 and Mode 3, a sidelink WTRU may receive a resource grant for sidelink transmission and the resource grant may be monitored in a search space configured for the Uu interface.

In NR for 5G wireless systems, a new structure and design may be adopted for a physical downlink control channel (PDCCH) as well as a physical downlink shared channel (PDSCH). Additionally, slot-based and non-slot-based transmissions and different rates of monitoring for the PDCCH may be defined.

In 5G NR, a Resource Element Group (REG) may be the smallest building block for the PDCCH. Each REG may consist of 12 resource elements (REs) on one OFDM symbol in time and one resource block (RB) in frequency. In each REG, 9 REs may be used for control information and 3 REs may be used for one or more demodulation reference signals (DM-RSs). Multiple REGs (2, 3, or 6), adjacent in time or frequency, form an REG bundle which may be used with the same precoder and their DM-RSs may be used together for channel estimation. 6 REGs (in the format of 1, 2, or 3 REG bundles) may form one Control Channel Element (CCE) which is the smallest possible size for a PDCCH. Each PDCCH may include one or multiple CCEs, for example, 1, 2, 4, 8, or 16 CCEs; and the number of CCEs for a PDCCH may be called its aggregation level (AL).

Mapping of REG bundles may have two different modes of interleaving and non-interleaving. In the non-interleaving mapping, consecutive REG bundles, adjacent in frequency, may form a CCE and CCEs, adjacent in frequency, may form a PDCCH. In the interleaving mapping, REGs may be interleaved, or permuted, before being mapped to CCEs, resulting in generally non-adjacent REG bundles in one CCE and non-adjacent CCEs in one PDCCH.

A Control Resource Set (CORESET) may be configured by its frequency assignment, which may be as chunks of 6 RBs; the length in time, which may be 1-3 OFDM symbols;

the type of REG bundle; and the type of mapping from REG bundles to CCEs, for example whether it is interleaving or non-interleaving. In each bandwidth part (BWP), there may be up to 3 CORESETs. In an example, there may be 12 CORESETs in all 4 possible bandwidth parts.

Each WTRU may be assigned with a set of PDCCH candidates to be monitored during the blind detection of PDCCH which may be called a search space or a set of search spaces, for multiple aggregation levels. Each set of search space may be configured by its associated CORESET, the number of candidates with each aggregation level, and the monitoring occasions. The monitoring occasions may be determined by monitoring periodicity, which may be in terms of slots, monitoring offset, and monitoring pattern. For example, the monitoring pattern may include 14 bits corresponding to all possible patterns of symbols inside a slot.

A slot format indicator (SFI) may provide an indication, for example, a dynamic indication, of the direction of one or more symbols, for example, in a slot or set of slots. A direction may be at least one of UL, DL, or flexible. A SFI may be provided in a PDCCH. Symbol directions, for example, in a slot, may be configured by higher layer signaling. A direction indicated in an SFI may override a direction configured by higher layer signaling.

An aspect of reliability of a control channel, both for downlink Uu and for sidelink, is to have a low probability of blocking. Blocking may occur when no configured resource is available for scheduling a PDCCH or PSCCH. Increasing the pool of resources may help to reduce this blocking probability. However, because of the stochastic nature of traffic, for both Uu traffic and sidelink traffic, there can be large fluctuations in the instantaneously required resources for each of these two applications. Therefore, allocating separate resources for each application and designing the system for the worst-case traffic of each application reduces the resource efficiency of the system, because of very low average resource utilization, for example. In an example, sidelink traffic may have low average resource utilization yet have been allocated a level of resources high enough for a worst-case traffic scenario. Similarly, Uu traffic may have low average resource utilization yet have been allocated a high level of resources. Also, in some cases, there might be not enough available resources to have this type of separate design for the worst-case traffic for each channel under various use cases.

In some scenarios, limited PSCCH link adaption may reduce the resource efficiency of the system. In LTE V2X, a PSCCH resource in resource pool may be fixed to 2 RBs in a subframe. In addition, its modulation order may also be fixed to quadrature phase shift keying (QPSK). The range of a PSCCH transmission may be determined based on the number of RBs allocated for the PSCCH transmission and on the modulation and coding scheme (MCS) level used. Considering that NR V2X may require a wider range, for example 750 m, than used in LTE for some V2X use cases, the current LTE fixed PSCCH link adaptation may not be appropriate for NR V2X.

In addition, LTE V2X may be designed for broadcast or group-cast transmission, and therefore a fixed resource allocation targeting the worst case scenario may be reasonable. However, link adaptation of PSCCH may be required for NR V2X as a unicast transmission may need to be supported as well.

In some scenarios, limited resources for sidelink communication may reduce the resource efficiency of the system. In NR V2X, the sidelink control channel may be expected to carry control information which greatly varies in terms of payload, reliability, latency and communications range in support of a wide range of enhanced V2X services. In addition, as noted, the sidelink control information may be expected to be transmitted as unicast, multicast and broadcast compared to the LTE V2X which may be limited to broadcast or group-cast. In the case of unicast, the WTRU which initiates a transmission may require feedback from the receiving WTRU to achieve high reliability, resource efficiency or both. Accordingly, methods which could efficiently multiplex one or more sidelink control channels with one or more Uu control channels may be desirable. Techniques to efficiently multiplex the sidelink control channels transmitted in either direction in a sidelink communication may also be needed.

According to examples disclosed herein, PSCCH link adaptation may be associated with a coverage level for sidelink. A coverage level may correspond to or be determined based on at least one of a V2X mode of operation, a radio resource control (RRC) connection status, and/or a downlink measurement level. In examples, a V2X mode of operation may be a scheduled mode or an autonomous mode. Further, the mode of operation may be a mode of operation of the WTRU. In an example, the RRC connection status may be the connection status of the WTRU.

In a V2X mode of operation, a scheduled mode may be a mode of operation in which a gNB may schedule one or more resources for PSCCH transmission, PSSCH transmission or both. As recited herein, a scheduled mode may be interchangeably used with, and still be consistent with examples provided herein, a Mode-1, a gNB scheduled mode, and/or a mode in which a gNB may schedule sidelink resources for sidelink transmission between two WTRUs. An autonomous mode may be a mode of operation in which a WTRU may autonomously determine one or more resources within candidate resources for PSCCH transmission, PSSCH transmission or both. The candidate resources may be preconfigured. As recited herein, an autonomous mode may be interchangeably used with, and still be consistent with examples provided herein, a Mode-2, a WTRU scheduled mode, and/or a mode in which a WTRU (for example, a sender WTRU, a source WTRU, a WTRU with a source-ID and the like) may schedule sidelink resources for sidelink transmission to another WTRU (for example, a receiver WTRU, a destination WTRU, a WTRU with a destination-ID and the like).

In an RRC connection status example, RRC connected, RRC inactive and RRC idle may be considered as a first coverage and no RRC status may be considered as a second coverage. In examples, the first coverage may be an in-network coverage and the second coverage may be out-of-network.

In an example, a downlink measurement level may be an reference signal received power (RSRP) measurement level of a measurement reference signal. For a downlink measurement level the measurement reference signal may include one or more of the following: a synchronization signal block (SSB), a channel state information reference signal (CSI-RS), a tracking reference signal (TRS) or a DM-RS.

The terms coverage level, coverage, proximity, proximity level, distance, distance level, range, range level, and measurement quality may be used interchangeably herein and still be consistent with the examples and embodiments provided.

One or more PSCCH resource units (PRUs) may be used for a PSCCH transmission. In examples provided herein, PSCCH link adaptation may be based on one or more PRUs.

A PRU may be at least one of, may be comprised of at least one of and/or may be defined, determined, or identified based on at least one of an RB; a number of symbols; a CCE, a REG, and/or a REG bundle which may be used for a PDCCH; a PUCCH resource; a slot; and/or a subframe or a radio frame.

In an example, the RB may contain or comprise a set of subcarriers. In an example, the set may include 12 subcarriers. Further, the subcarriers may be consecutive or adjacent. Moreover, the set of subcarriers may include a number of symbols that may be within a time period or time unit such as a slot, a subframe or a radio frame.

A number of symbols may be determined based on at least one of the number of uplink symbols, the number of downlink symbols, and the number of flexible symbols configured, determined, and/or indicated in a time period or unit such as a slot. The number of symbols may be fixed to, for example, 14, may be configured via a higher layer signaling, and/or may be the same as the number of symbols used for a mini-slot if a mini-slot is used for a sidelink transmission. Further, the term mini-slot may be used interchangeably with a sub-slot, a non-slot, an x-symbol slot, and the like, and still be consistent with the examples provided herein.

A CCE, a REG, or a REG bundle may be used for a PDCCH such that, for example, a subset of PDCCH resources may be used for a sidelink transmission. In an example, the subset of PDCCH resources may include a CCE, a REG, and/or a REG bundle. Further, the sidelink transmission may be on a PSCCH, in an example.

For a PUCCH resource, the number of RBs used for the PUCCH resource may be configured via higher layer signaling or determined based on a coverage level.

One or more link adaptation modes may be used for a PSCCH transmission. The link adaptation mode may be determined based on traffic type. One or more traffic types may be used. For example, three traffic types may be used. In one example, broadcast, group-cast, and unicast traffic types may be used. Further, a WTRU may determine a link adaptation mode based on which traffic type is used.

A fixed or semi-static link adaptation mode may be used, where the number of PRUs may be predefined, configured, or indicated by a gNB. In an example, the fixed or semi-static link adaptation mode may involve a fixed or semi-static number of PRUs and/or fixed MCS. The fixed or semi-static link adaptation mode may be used for a traffic type. In examples, the link adaptation mode may be used for a first traffic type. The first traffic type may be a broadcast traffic type, in an example.

A flexible link adaptation mode may be used, where a set of PRU aggregation levels may be configured, determined, or indicated, for example, by a gNB, and a WTRU may select a PRU aggregation level, for example, from the set, for a PSCCH transmission. The flexible link adaptation mode may be used for a traffic type. In examples, the link adaptation mode may be used for a second traffic type. The second traffic type may a unicast traffic type and/or a group-cast traffic type, in examples. A first PRU aggregation level may correspond to a first number of PRUs, a second PRU aggregation level may correspond to a second number of PRUs, and so forth. The first number of PRUs and the second number of PRUs may be different from each other, and one or more sets of PRU aggregation levels may be used.

In an example, a subset of PRU aggregation levels for a PSCCH/PSSCH transmission may be determined based on at least one of a QoS of the packet to be transmitted in the PSSCH, a channel busy ratio (CBR) range, the number of RBs per subchannel, the number of subchannels selected for a PSCCH/PSSCH transmission and the minimum required communication range. Further, a WTRU may select a PRU aggregation level from the determined subset.

One or each traffic type may be associated with sidelink control information (SCI) for a PSCCH transmission. A first SCI, for example, an SCI format, may be used for a broadcast traffic type and/or group-cast traffic type and the first SCI may include a group destination ID. A second SCI may be used for a unicast traffic type and the second SCI may include a WTRU-ID which may be a sender WTRU-ID or a receiver WTRU-ID.

A coverage level or range of a WTRU may be used. A WTRU may determine a resource or set of resources for transmission of a control channel such as a PSCCH based on a coverage level or range of the WTRU. The range of the WTRU may be a distance to another WTRU or to the intended recipient of the PSCCH, in examples. For example, for poorer coverage, more resources may be used. More resources may include a larger set of resources, in an example.

A first WTRU may be a sender WTRU and a second WTRU may be a receiver WTRU, or vice-versa. In addition, the terms V2X communication, vehicle-to-vehicle (V2V) communication, D2D communication, direct communication, sidelink communication, UE-to-UE communication and WTRU-to-WTRU communication may be interchangeably used in examples provided herein.

According to an example, a set of PRUs may be configured by a gNB as a resource pool for PSCCH transmission, for example, a PSCCH resource pool, and a subset of PRUs in the PSCCH resource pool may be used. For example, control information, for example SCI may be transmitted in a subset of PRUs in the PSCCH resource pool, wherein the subset of PRUs, for example the number of PRUs, may be determined based on one or more of the following: a measurement signal, for example, from a WTRU; a distance between two WTRUs that may, for example, be determined by at least one of the WTRUs based on positioning information; a coverage level or range; an RRC connection status, for example, connected, inactive, idle; a V2X mode of operation, for example, scheduled mode, autonomous mode and the like; and/or a coverage status, for example, in network coverage, out of network coverage and the like.

According to an example, if a measurement, for example, of a signal from a WTRU, is below a threshold, a first subset or a first number of PRUs may be used. If the measurement is above a threshold a second subset or number of PRUs may be used. The first subset may be larger than the second subset. The measurement may be an RSRP measurement, a channel state information (CSI) measurement or both. In examples, the CSI may include one or more of a channel quality indicator (CQI), a pre-coding matrix indicator (PMI) or a rank indicator (RI). The signal may be a discovery signal from a first WTRU or a second WTRU. A first WTRU may measure a signal from a second WTRU and may determine a subset or number of PRUs for PSCCH transmission. The first WTRU may transmit the PSCCH on the determined PRUs.

According to another example, a first subset or number of PRUs may be used if the distance between a first WTRU and a second WTRU is less than a first threshold. Further, a second subset or number of PRUs may be used if the distance between a first WTRU and a second WTRU is greater than the first threshold or greater than the first threshold and less than a second threshold, and so on. A distance may be used interchangeably with a range, coverage, or proximity and still be consistent with examples provided herein. The subset or number of PRUs that may be used for PSCCH based on a distance may be predetermined, preconfigured, configured, or indicated, for example, by a gNB.

In an example, positioning information may be provided by a first WTRU to a second WTRU. In another example, positioning information may be provided by a second WTRU to a first WTRU. The positioning information may be transmitted in the discovery signal and may be provided optionally when it is available. Further, the positioning information may be exchanged between the first WTRU and the second WTRU. Also, the positioning information may be location information obtained from a GPS signal and/or positioning reference signals. In an example, the location information may be obtained from a Global Navigation Satellite System (GNSS).

In a scheduled mode, a gNB may provide distance information such as, for example, when the gNB schedules the resource for PSCCH transmission.

A WTRU may determine a number of PRUs based on a channel condition, distance, and/or positioning information. The WTRU may determine the subset of PRUs based on the number of PRUs determined. One or more subsets of PRUs may be predefined or configured for a number of PRUs that may be used for PSCCH transmission. The one or more subsets of PRUs may be mutually exclusive, partially overlapped, or fully overlapped. Based on the number of PRUs used or determined, a sender WTRU and/or a receiver WTRU may have information, for example, from configuration, regarding which subsets of PRUs may be use. For a given number of PRUs, one or more subsets of PRUs may be determined as candidates for PSCCH transmission. A sender WTRU may select one of the subsets of PRUs for a PSCCH transmission and a receiver WTRU may attempt to decode one or more determined candidates. In an example, the receiver WTRU may attempt to decode all determined candidates.

When positioning information is available, the number of PRUs, and/or the subset of PRUs, for PSCCH transmission and/or reception may be determined based on the distance between two WTRUs or based on positioning information. Alternatively, the number of PRUs, and/or the subset of PRUs, may be determined based on the measurement of a signal from at least one of the WTRUs.

Figure 2:
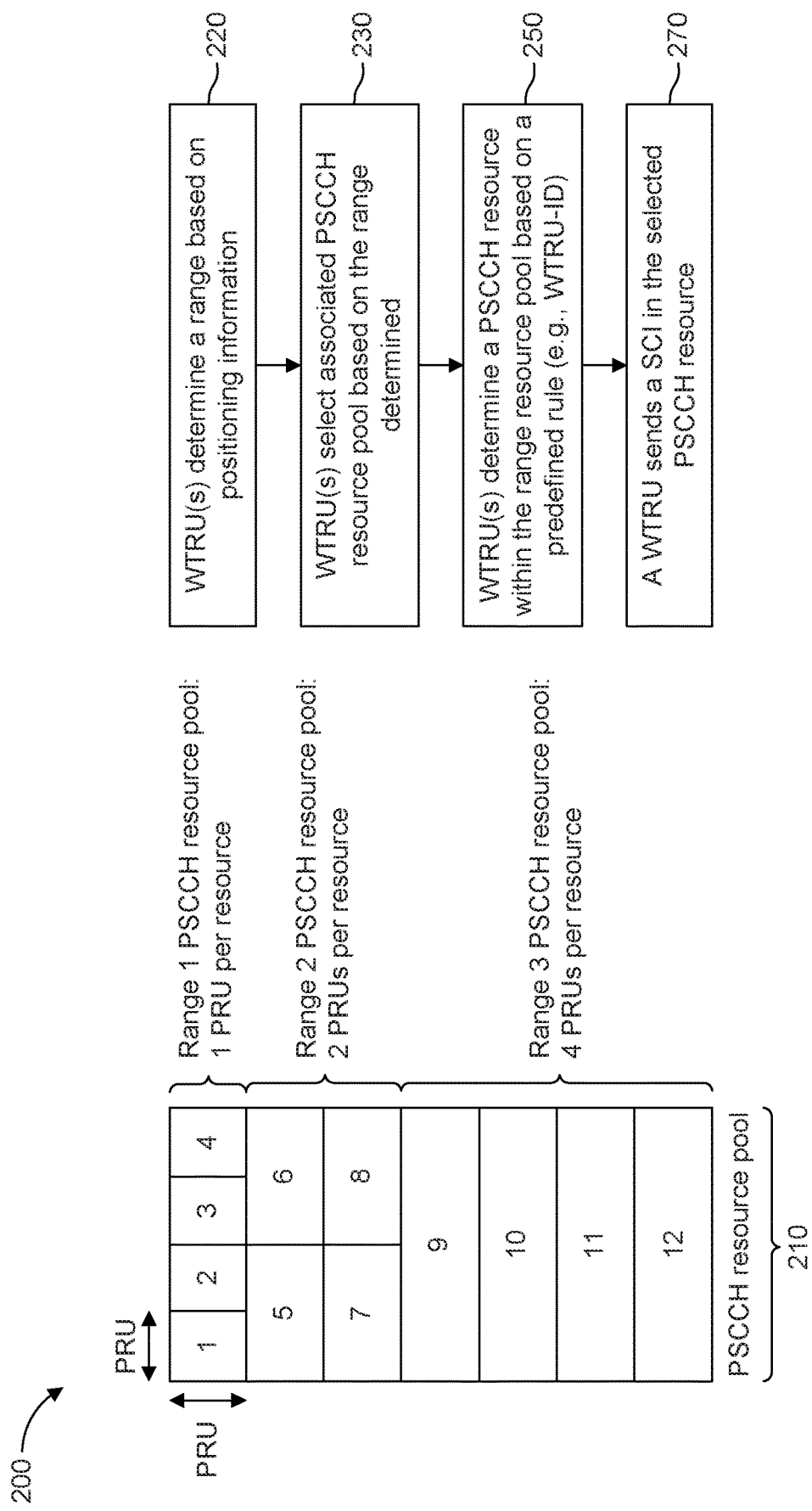
FIG. 2 is a diagram illustrating an example of a physical sidelink shared channel (PSCCH) resource pool per range and procedures to determine a PSCCH resource.

FIG. 2 is a diagram illustrating an example of a PSCCH resource pool per range and procedures to determine a PSCCH resource. Specifically, FIG. 2 shows an example PSCCH resource pool configuration and WTRU procedures to determine a PSCCH resource, to use to send SCI, from within the resource pool. As shown in an example in FIG. 2, a resource pool may corresponds to a range, for example, a distance or a proximity, between 2 WTRUs. For example, the range may be between a WTRU transmitting, for example, a PSCCH, and a WTRU receiving, for example, the PSCCH. Further, positioning information may be used to determine the range.

Measurement may be substituted for positioning information and still be consistent with the examples provided herein. A coverage level may be substituted for range and still be consistent with the examples provided herein.

In an example shown in FIG. 2, a gNB may configure a PSCCH resource pool 210, which may include a set of PRUs, and the PRUs in the PSCCH resource pool may be split into one or more range-specific PSCCH resource pools such that the range-specific PSCCH resource pool may be used by WTRUs having the corresponding range.

As an example, three range-specific PSCCH resource pools may be used, determined, or configured, for example, by a gNB. In an example shown in FIG. 2, the ranges may be labelled as Range 1, Range 2 and Range 3. A first range may be up to k1 meters, for example, k1=10, and may include one PRU per resource. Also, a second range may be up to k2 meters, for example, k2=50, and may include two PRUs per resource. Further, a third range may be k3 meters, for example, k3=100, and may include four PRUs per resource. Accordingly, a PSCCH resource may contain one or more PRUs and the same number of PRUs may be used, or configured, for a PSCCH resource in the same range-specific PSCCH resource pool. In examples, a range of larger distance may use more PRUs than a range of smaller distance. The term range may be used interchangeably with minimum required communication range for a sidelink packet or service, and still be consistent with examples and embodiments provided herein.

The set of PRUs for each range-specific PSCCH resource pool may be mutually exclusive, partially overlapped, or fully overlapped. In an example shown in FIG. 2, the sets of PRUs are mutually exclusive.

One or more range-specific PSCCH resource pools may be located in a different time and/or frequency resources. A subcarrier spacing may be independently configured, determined, or used for a range-specific PSCCH resource pool. In an example, for each range-specific PSCCH resource pool a subcarrier spacing may be independently configured, determined, or used. A subcarrier spacing may be different for a PSCCH resource based on the associated range.

DM-RS density may be configured, determined, or predefined for a range-specific PSCCH resource pool. In an example, for each range-specific PSCCH resource pool a DM-RS density may be configured, determined, or predefined. A higher DM-RS density may be used for a range-specific PSCCH resource pool which targets for larger range. For example, 2 symbol DM-RS density may be used for a PSCCH resource pool associated with a first range, for example, up to k1 meters, and 3 symbol DM-RS density may be used for a PSCCH resource pool associated with a second range, for example, up to k2 meters, and 4 symbol DM-RS density may be used for a PSCCH resource pool associated with a third range, for example, up to k3 meters.

In an example shown in FIG. 2, a WTRU may determine a range 220, for example, a distance or a proximity, based on positioning information received, for example, during a setup procedure between WTRUs. From the positioning information of the receiver WTRU, the sender WTRU may determine the range between the WTRUs. A measurement of a signal from one of the WTRUs may be used to determine a range, for example, when positioning information is not available.

The WTRU may select an associated PSCCH resource pool based on the range determined 230. For example, a WTRU may determine a range-specific PSCCH resource pool within the configured resource pool based on the determined range. The determined range may be known between two WTRUs for direct communication. One of the two WTRUs may receive a positioning information of the other WTRU and determine the range. Then, the determined range information may be signaled to the other WTRU. Positioning information of two WTRUs may be exchanged for range determination and both WTRUs may use the same positioning information to determine the range. Zone information, for example, a Zone-ID, of two WTRUs may be exchanged for range determination, such that zone information such as a Zone-ID may be determined based on positioning information of the WTRUs and higher layer configured parameters, for example, Zone size, and the like. A PSCCH resource pool may contain one or more PSCCH resources, wherein each PSCCH resource may be used for a PSCCH and its associated PSSCH transmission.

A WTRU may determine a PSCCH resource within a PSCCH resource pool 250, for example, a range-specific PSCCH resource pool, based on a rule, wherein the PSCCH resource pool may include one or more PSCCH resources, for example for the corresponding range. In an example, the rule may be a predefined rule. Further, the rule may involve a UE-ID or WTRU-ID.

A WTRU-ID may, for example, implicitly, be used, for example, by a WTRU, to determine a PSCCH resource within the PSCCH resource pool. The WTRU-ID may be an ID configured by a gNB for direct communication. For example, the WTRU-ID may be a sidelink radio network temporary identifier (SL-RNTI) that may be configured for a specific mode of operation, for example, V2X Mode 3 and/or 4. The WTRU-ID may comprise one or more most significant bits (MSBs) or least significant bits LSBs of the WTRU's international mobile subscriber identity (IMSI). The WTRU-ID may be a cell-RNTI (C-RNTI), for example, when all WTRUs for a direct communication are in the same serving cell. And/or the WTRU-ID information may be known for both WTRUs. For example, in a scheduled mode, a gNB may provide the WTRU-ID information to WTRUs involved for a direct communication.

A Doppler frequency, for example, relative speed for the WTRUs, may be used to determine a PSCCH resource within the PSCCH resource pool. The relative speed may be determined based on the time/frequency density of DM-RS or phase tracking reference signal (PTRS) for PSCCH and/or PSSCH transmission. If higher density is used, the relative speed may be considered as higher.

An energy level detected for a given time window in each PSCCH resource may be used to determine a PSCCH resource within the PSCCH resource pool. A WTRU may perform sensing for the PSCCH resources for a time window and the PSCCH resource which may have lowest energy level may be determined as a PSCCH resource for SCI transmission A random selection may be used to determine a PSCCH resource within the PSCCH resource pool. A range may be interchangeably used with a Doppler frequency, a speed, a mobility level, or relative speed between two WTRUs and still be consistent with examples provided herein. Further, a WTRU may send an SCI message in the selected PSCCH resource 270.

In examples, coverage reporting may be based on PSCCH PRU. For example, a WTRU may report its coverage or distance level based on the number of PRUs used to successfully decode an SCI message. For example, an SCI message may be transmitted with N PRUs and the SCI may be decodable with a subset of N PRUs. A WTRU may attempt to decode an SCI message with a subset of N PRUs and if the WTRU successfully decodes the SCI message with a subset of N PRUs, the WTRU may report, indicate, or send the number of PRUs in the subset.

Further to this example, one or more subset numbers may be configured, or preconfigured. For example, when N PRUs are used, the subset numbers may include one or more of N/16, N/8, N/4, and N/2. Each subset number may be associated with a subset ID. For example, subset ID=0 may be associated with N/16, subset ID=1 may be associated with N/8, and the like. N PRUs may be a maximum PSCCH aggregation level. In an example, the aggregation level may be a CCE aggregation level, a PRU aggregation level and the like. Further, the aggregation level may be within a set of aggregation levels. Also, a subset of N PRUs may be another aggregation level, which may also be within the aggregation level set. For example, a PSCCH aggregation level set AL-{n1, n2, n3, n4} may be configured, determined, or used, such that AL-n4 may be the maximum aggregation level. A WTRU may attempt to decode all aggregation levels and indicate, report, or feedback the smallest aggregation level in which a WTRU may successfully decode an associated SCI message. A WTRU may determine whether it successfully decodes an associated SCI or not based on the cyclic redundancy check (CRC) check of the SCI. N PRUs may be a maximum repetition number of PSCCH transmissions. In examples, the repetitions may involve the number of symbol used, the number of retransmissions, the number of transmissions, and the like. A PSCCH may be transmitted N times. Further, a PSCCH may be transmitted N times if a WTRU successfully decodes an associated SCI message with a subset of repetitions. A parameter Ns may be used to indicate the coverage level or distance between two WTRUs. In an example, Ns may be less than N.

Alternatively or in addition, a WTRU may report its coverage or distance level based on time differences between reference timing and timing at which a destination WTRU received the signal from a sender WTRU. The reference timing may be based on the Uu signal from a gNB. For example, an in-coverage WTRU may determine the reference timing based on a Uu synchronization signal, for example, an SS/PBCH block, or a CSI-RS, for example, a tracking reference signal, from the gNB. Alternatively or in addition, the reference timing may be based on GNSS. Alternatively or in addition, the reference timing may be based on a sidelink synchronization signal transmitted from a local manager, wherein the local manager may be a WTRU which may schedule sidelink resources for sidelink transmission between other WTRUs.

One or more CORESETs and the associated search space(s) of the one or more CORESETs may be used for PSCCH transmission. In an example, associated search spaces for each of the one or more CORESETs may be used for PSCCH transmission.

According to an example, one or each configured CORESET for sidelink may be associated with a subset of physical resource blocks (PRBs) within the active BWP. The subset of PRBs may be used for PSCCH transmission and/or PSSCH scheduling. For example, a WTRU may transmit an SCI in a CORESET to schedule PSSCH which may be associated with the CORESET. The terms PRB and RB may be used interchangeably and still be consistent with examples and embodiments provided herein.

The one or more CORESETs for PSCCH transmission may be transmitted or monitored in resources configured as uplink, for example, by an SFI and/or by higher layer signaling. Alternatively or in addition, the subset of PRBs may be a part of a CORESET configuration.

Alternatively or in addition, the subset of PRBs may be implicitly determined. The same set of PRBs configured for the CORESET for PSCCH may be used, for example to improve resource utilization and avoid collision from multiple CORESETs. The CORESET and PSSCH may be multiplexed in the time domain, for example, in the same slot or a different slot, within the same set of PRBs. The subset of PRBs may be a function of the PRB configuration for the associated CORESET for PSCCH. For example, the PRBs for the CORESET and its adjacent N PRBs may be used for PSSCH transmission.

Alternatively or in addition, the subset of PRBs may be determined based on at least one of a slot number, a subframe number, and a frame number, for example, of the PSCCH transmission.

Alternatively or in addition, the subset of PRBs may be determined based on a slot format, for example, based on the slot format of the slot in which the PSCCH is transmitted. The slot format may include, for example, a number of downlink symbols, a number of uplink symbols, and a number of flexible symbols.

Alternatively or in addition, the subset of PRBs may be determined based on the number of available REs for sidelink, for example in the slot or symbols in which the PSCCH is transmitted. The REs allocated for a specific direction, for example, DL, may not be counted as available REs. The REs for PDSCH or Physical Uplink Shared Channel PUSCH muting, or rate-matching, may not be counted as available REs. The REs for broadcast transmission, for example, SSB, CORESET #0, may not be counted as available REs. And/or the REs for periodic transmission, for example, periodic CSI-RS, TRS, may not be counted as available REs.

Figure 3:
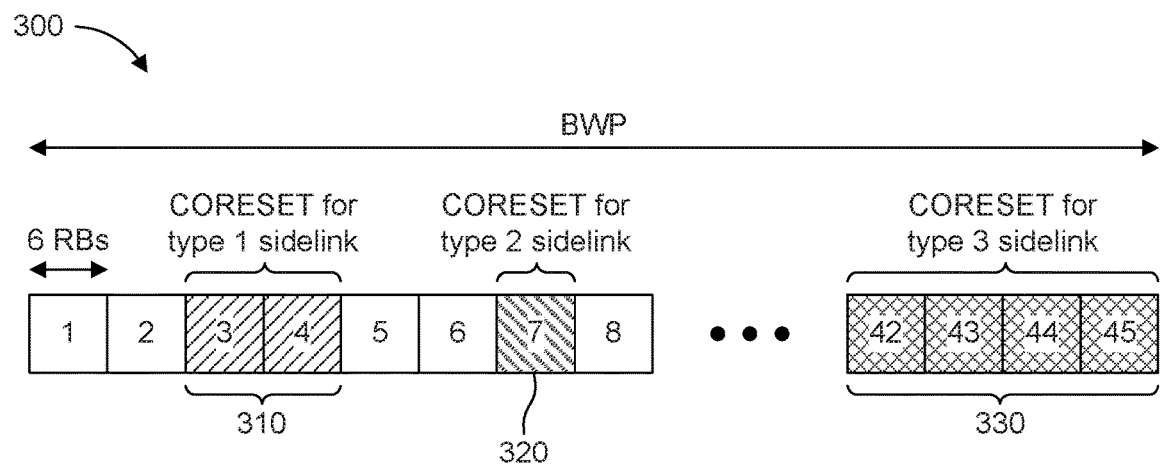
FIG. 3 is a diagram illustrating an example of a Control Resource Set (CORESET) configuration based on sidelink type.

FIG. 3 is a diagram illustrating an example of a CORESET configuration based on sidelink type. According to an example, one or each CORESET configured for a sidelink may be used for, configured for, or associated with a sidelink type, for example, a first sidelink type, a second sidelink type, or a third sidelink type as in an example shown in diagram 300. Further sidelink types may also be configured. In an example, a first sidelink type may be a type 1 sidelink and the CORESET for this sidelink type may associate with two RBs 310. Further, a second sidelink type may be a type 2 sidelink and the CORESET for this sidelink type may associate with one RB 320. Moreover, a third sidelink type may be a type 3 sidelink and the CORESET for this sidelink type may associate with four RBs 330.

The sidelink type may be determined based on one or more of a coverage level, a relative speed or a DM-RS configuration. In an example, the coverage level may include one or more of a range, proximity, distance, measurement level, and the like. Further, a relative speed may be associated with a Doppler frequency. Also, the DM-RS configuration may be a DM-RS configuration for PSSCH transmission. In an example, the DM-RS configuration may be a 1 symbol front-loaded DM-RS and N additional DM-RS(s). In another example, the DM-RS configuration may be a 2 symbol front-loaded DM-RS and M additional DM-RS(s). In a further example, the DM-RS configuration may be a DM-RS location within a slot.

Alternatively or in addition, the sidelink type may be determined based on a use case which may be determined based on whether the destination ID is a group ID, for example, for group-cast or broadcast, or a WTRU ID, for example, for unicast.

Alternatively or in addition, the sidelink type may be determined based on a sensing scheme. For example, one or more sensing schemes may be used. A first sensing scheme may be based on a first time window during which a WTRU may need to perform sensing to determine a PSCCH resource within the CORESET. In another example, a second sensing scheme may be based on a second time window, where the first time window and the second time window may be predefined, predetermined, or configured by a gNB.

Alternatively or in addition, the sidelink type may be determined based on a sidelink mode of operation. Further, the sidelink mode of operation may be a scheduled mode or an autonomous mode, in examples.

One or each CORESET may be associated or configured with a set or subset of PRBs for PSSCH transmission, where the set or subset of PRBs may be determined based on the sidelink type associated with the CORESET. For example, the same set of PRBs configured for the CORESET for PSCCH may be used for the associated PSSCH transmission and multiplexed in the time domain for the first sidelink type and a configured set of PRBs may be used for the associated PSSCH transmission for the second sidelink type. In an example, the PRBs may be multiplexed in the time domain in a different set of symbols in the slot or a different slot. Further, the configured set may be a separately configured set, in an example.

One or more CORESETs may be configured for a sidelink transmission and one or each CORESET may be configured with a time offset between the last symbol of the CORESET and the first symbol of the PSSCH. A CORESETs configuration may be provided to a WTRU, in an example. In another example, a CORESETs configuration may be known to a WTRU. A WTRU, for example, a transmitting WTRU, may determine and/or use one of the CORESETs configured, for example, in order to indicate an associated time offset for PSSCH transmission to another WTRU, for example, a receiving WTRU.

As an example, a first CORESET may be configured with n+k1 time offset and a second CORESET may be configured with n+k2 time offset. The configuration may be provided to and/or known to a first WTRU and a second WTRU. The first WTRU, for example, a transmitting WTRU, may send a PSCCH in the first CORESET. The second WTRU, for example, a receiving WTRU may receive the PSSCH with n+k1 timing. When SCI includes a time offset indication, a higher layer configured time offset may be overridden by the indicated time offset from the SCI.

Alternatively, according to an example, an SCI type may be used to determine the time offset value for PSSCH transmission/reception. For example, one or more SCI types may be used, determined, or defined, and then transmitted/received. Then, based on the one or more SCI types transmitted/received, the time offset for PSSCH may be determined.

An SCI type may be determined based on an SCI format for a sidelink mode of operation. A first SCI format, for example, SCI format 0, may be used for a first sidelink mode of operation, for example, a gNB scheduled mode. Further, a second SCI format, for example, SCI format 1, may be used for a second sidelink mode of operation, for example, WTRU autonomous resource selection.

An SCI type may be determined based on an SCI format used for a specific Uu resource. For example, a first SCI format, for example, SCI format 0, may be used for PSCCH, and/or PSSCH, transmission in uplink resources, and/or flexible resources, configured for the Uu interface. Further, a second SCI format, for example, SCI format 1, may be used for PSCCH, and/or PSSCH, transmission in downlink resource configured for the Uu interface.

An SCI type may be determined based on traffic type of an associated PSCCH. For example, a first SCI type may be used for broadcast and/or group-cast transmission and a second SCI type may be used for unicast transmission such that if an SCI is used for broadcast or group-cast, the SCI may include a group-destination ID. Alternatively or in addition, if an SCI is used for unicast, the SCI may include a WTRU-ID, for example, a transmitting and/or receiving WTRU identity.

The terms SCI type and sidelink type may be used interchangeably for each other and still be consistent with the examples and embodiments provided herein.

According to an example, a gNB may activate/deactivate one or more CORESETs configured for sidelink. For example, for a CORESET for a first sidelink type (for example, gNB scheduled mode), a gNB may activate the associated CORESET. The activation information may be in the resource grant for sidelink transmission. In an example, the first sidelink type may be for the CORESET associated with the two RBs 310.

The resource grant for sidelink transmission may be monitored in at least a group-common PDCCH, a group-common search spaces, and/or a WTRU-specific search space.

One or more group-common search spaces may be configured for the grant of sidelink transmission. Each group-common search space may be associated with a sidelink type. The group-common search space may be search space #0. The group-common search space may be a search space configured for a DCI with SL-RNTI.

Regarding a WTRU-specific search space, when a WTRU monitors a DCI for a sidelink resource grant, the WTRU may monitor a group common search space if the sidelink transmission is for broadcast or group-cast traffic. The WTRU may monitor a WTRU-specific search space if the sidelink transmission is for unicast traffic. A dedicated WTRU-specific search space with a C-RNTI or a configured scheduling-RNTI (CS-RNTI) may be configured for the sidelink resource grant.

A time gap may be used between gNB activation signal reception for one or more CORESETs, or search spaces, for the sidelink and the start time of active window for the CORESETs, or search spaces. The time gap may be determined based on at least one of the sidelink type, a waveform used for sidelink transmission, a subcarrier space, or a WTRU capability.

An activated CORESETs, or search spaces, may remain active until a WTRU receives a deactivation signal. A WTRU may monitor the CORESETs, or search spaces, while they are active or activated.

The activated CORESETs, or search spaces, for a sidelink may be deactivated autonomously when there is no sidelink data to send. Therefore, a WTRU may not monitor the active CORESETs, or search spaces, when it finishes receiving sidelink data (for example, all sidelink data).

A first WTRU may signal to a second WTRU an indication that the first WTRU's transmission is complete and/or that the second WTRU may not need to monitor the activated CORESETs, or search spaces, for a sidelink for at least some time. In an example, the first WTRU may be a sender WTRU and the second WTRU may be a receiver WTRU.

Further, the activation signal for monitoring one or more CORESETs, or search spaces, may be indicated by a gNB while the deactivation signal for monitoring the activated CORESETs, or search spaces, may be indicated by a WTRU such as a first WTRU in a group of WTRUs for sidelink communication. In an example, the first WTRU may be a sender WTRU.

The activated CORESETs (or search space) may be active until a timer expires or is expired. The timer value may be predefined or configured and may be indicated in the control information where the activation signal is transmitted or received. If a WTRU may not finish its sidelink transmission before the timer expires, the WTRU may request a timer extension.

The activated CORESETs, or search spaces, may be or remain active while a counter is running. The counter may update in each PSCCH monitoring occasion, where a PSCCH monitoring occasion may be a slot or subslot in which a set of PSCCH candidates is monitored. In examples, the counter may update by increasing or decreasing. The counter may reset, for example, to 0 or another starting value, when a WTRU receives the activation signal or indication, for example, from a gNB. The counter may stop when it reaches a stopping value or threshold that may be a maximum, for example, for an increasing counter, or a minimum, for example, for a decreasing counter. The stopping value or threshold may be configured, predetermined, or indicated in the grant for a sidelink resource.

The terms a CORESET and a search space may be used interchangeably and still be consistent with one or more examples provided herein. In addition, the terms CORESET and PSCCH resource set may be used interchangeably and still be consistent with examples provided herein. A search space may include one or more PSCCH candidates in a PSCCH monitoring occasion. A search space for sidelink may be associated with a CORESET configured for sidelink transmission. One or more search spaces may be configured for sidelink transmission and be associated with the same CORESET or different CORESETs.

According to an example, unused CEs may be identified. One or more PRU sets may be used for PSCCH blind decoding wherein a PRU set include one or more RBs.

Figure 4:
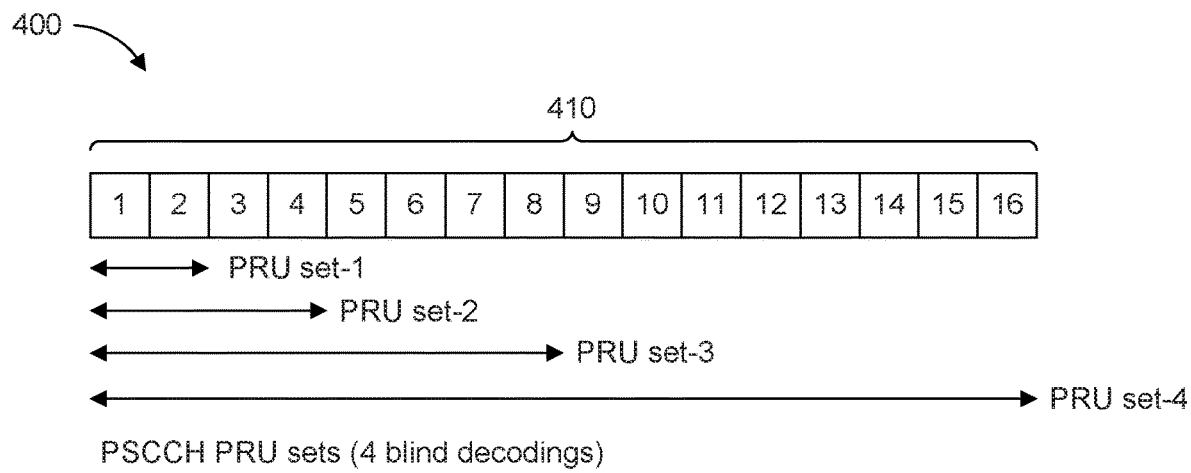
FIG. 4 is a diagram illustrating an example of multiple PSCCH resource unit (PRU) sets for PSCCH blind decoding.

FIG. 4 is a diagram illustrating an example of multiple PSCCH resource unit (PRU) sets for PSCCH blind decoding. In an example shown in diagram 400, PRUs 410 may be numbered 1 through 16. A PRU set-1 may include PRUs 1 and 2. Also, a PRU set-2 may include PRUs 1 through 4. Further, a PRU set-3 may include PRUs 1 through 8 and a PRU set-4 may include PRUs 1 through 16.

A set of PRUs which may schedule a PSSCH may be located within a PSSCH frequency resource. For example, a PSCCH associated with a PSSCH may be located within the frequency resources for the associated PSSCH. A subset of PRUs may be used for PSCCH and the rest of CCEs within the PSSCH frequency resource may be used for other signal transmissions, wherein a subset of CCEs may be referred to as a CCE aggregation level. For example, the other signal may include at least one of: a part of the associated PSSCH; an automatic gain control (AGC) training signal; a reference signal, for example, a DM-RS or a CSI-RS; and/or a hybrid automatic repeat request acknowledgement (HARQ-ACK) signal, for example, a physical sidelink feedback channel (PSFCH). The set of CCEs may be predetermined or pre-configured.

According to an example, the number of PRU(s) used for a PSCCH transmission may be indicated in an SCI and the unused PRUs may be used for the associated PSSCH transmission. For example, an SCI may include information related to the number of PRUs used for the SCI transmission. A bit field in an SCI may indicate the number of PRUs used for the SCI transmission. This bit field may be referred to as at least one of a starting RB of the PSCCH transmission, an ending RB of the PSCCH transmission, or the number of RBs used for the PSCCH transmission. Alternatively or in addition, A scrambling id and/or scrambling mask for the CRC used for the SCI transmission may indicate the number of PRUs used. One or more identities may be used to scramble the CRC of the SCI, such that each identity may be associated with a number of PRUs. Further, an MCS level of the associated PSSCH may be used to determine the number of PRUs used for a PSCCH transmission. For example, if a lower MCS level is used for the associated PSSCH, a higher number of PRUs may be used for PSCCH transmission; if a higher MCS level is used for the associated PSSCH, a lower number of PRUs may be used for PSCCH transmission. For example, for N1<MCS level<=N2, a WTRU may determine that a first number of PRUs may be used for PSCCH and for N2<MCS level<=N3, the WTRU may determine that a second number of PRUs may be used for PSCCH, and so on. An SCI format or SCI format indicator may be used to determine the number of PRUs used for a PSCCH transmission.

According to an example, two types of waveform may be used for a sidelink transmission. For example, a first type of waveform may be OFDM for a sidelink transmission and a second type of waveform may be DFT-s-OFDM for a sidelink transmission. A WTRU, for example, a transmitting WTRU, may determine a waveform for a PSCCH transmission and/or a PSSCH transmission based on at least one of: a range, or coverage, for sidelink transmission; an MCS level determined for PSSCH; a repetition level determined for PSCCH, PSSCH or both; a retransmission number for a PSSCH; a transmission power level, for example, an offset level from the maximum transmission power; a MIMO related scheduling parameter, for example, transmission rank; a number of RBs scheduled for sidelink transmission; a relative speed for a sidelink channel; a DM-RS density; a Sidelink channel; an SCI format; and/or subcarrier spacing.

For a WTRU determining a waveform based on a transmission power level, for example, if the transmission power level is within a range from the peak transmission power, for example, Pc,max, a WTRU may use a second type of waveform for sidelink transmission. Otherwise, the WTRU may use a first type of waveform for sidelink transmission For a WTRU determining a waveform based on a number of RBs scheduled for sidelink transmission, in an example, if the number of RBs scheduled is less than a threshold, a WTRU may use a first type of waveform for a sidelink transmission. Otherwise, the WTRU may use a second type of waveform for a sidelink transmission.

For a WTRU determining a waveform based on a relative speed for a sidelink channel, for example, when a relative speed is higher than a threshold, a WTRU may use a second type of waveform for a sidelink transmission. Otherwise, a first type of waveform may be used for a sidelink transmission. In an example, the relative speed may be the speed of devices relative to each other, which are in sidelink communication with each other. The relative speed may be determined based on DM-RS density. For example, a higher DM-RS density may be considered as preferable to use when the communicating WTRUs are at a higher relative speed.

In an example of a WTRU determining a waveform based on a DM-RS density, one or more DM-RS densities may be used for a PSCCH and/or a PSSCH, where the DM-RS density may mean or correspond to at least a number of symbols used for DM-RS, for example, within a slot. For example, a first type of waveform may be used for a density with up to a number of DM-RS symbols, for example, 2 DM-RS symbols, and a second type of waveform may be used for a density with more than the number of DM-RS symbols, for example, 2 DM-RS symbols.

For a WTRU determining a waveform based on a sidelink channel, for example, a first sidelink physical channel, for example, a PSCCH, may be based on a first type of waveform, for example, DFT-s-OFDM and a second sidelink physical channel, for example, a PSSCH, may be based on a second type of waveform, for example, OFDM. Alternatively, a first sidelink physical channel may be based on a first type of waveform and the waveform for a second sidelink physical channel may be indicated from the first sidelink physical channel.

For a WTRU determining a waveform based on an SCI format, for example, a first waveform may be used when transmission or reception of a sidelink channel is associated with a first SCI format, and a second waveform may be used when transmission or reception of a sidelink channel is associated with a second SCI format. In an example, the first SCI format may be format 0. In a further example, the second SCI format may be format 1.

In a PSCCH resource pool, a first subset of PSCCH resources may be reserved for a first type of waveform and a second subset of PSCCH resources, for example, the rest of the PSCCH resources, may be reserved for a second type of waveform. A WTRU, for example, a transmitting WTRU, may determine a PSCCH resource for transmission based on the waveform the WTRU determines or intends to use for a sidelink transmission. Further, a gNB may provide a configuration information message regarding which PSCCH resource(s) are associated with which type of waveform. The PSCCH resources for different types of waveforms may be time multiplexed.

In a similar example, in a PSSCH resource pool, a first subset of PSSCH resources may be reserved for a first type of waveform and a second subset of PSSCH resources, for example, the rest of the PSSCH resources, may be reserved for a second type of waveform. A WTRU, for example, a transmitting WTRU, may determine a PSSCH resource for transmission based on the waveform the WTRU determines or intends to use for a sidelink transmission. Moreover, a gNB may provide a configuration information regarding which PSSCH resource(s) are associated with which type of waveform. The PSSCH resources for different types of waveforms may be time multiplexed.

According to an example, control channels may be shared between Uu and PC5. As a general matter, to improve efficiency in using resources, an approach may be to share resources between Uu links and PC5. According to an example, an approach may be to share part of the downlink resources for sidelink (PC5).

An example for sharing resources between Uu and PC5 may be performed by using a part of the resources allocated for a PDCCH for a PSCCH. To facilitate sharing resources between the PDCCH and the PSCCH, the same PDCCH structure, or a similar structure, may be used for the PSCCH.

According to this example, at least one of a PSCCH, a PSCCH resource, a PSCCH candidate, or a PSCCH decoding candidate may consist of one or more CCEs, where CCEs may be constructed based on the NR PDCCH of CCEs.

A collection of resources assigned for a sidelink control channel, which may also be called a sidelink control channel resource pool, may be configured as one CORESET or as a part of a PDCCH CORESET. The selection among PSCCH candidates inside a resource pool may be performed autonomously by the WTRU, using mechanisms such as semi-persistent scheduling (SPS) together with channel measurement or alternatively, the selection may be performed by a gNB through semi-static configuration, dynamic scheduling, or a mixture of both, such as, for example, a dynamic adaptation of the configured assignment.

The size of the PSCCH may be configurable by the gNB, may be fixed for all cases, may be dependent on the SCI format, or may be selected by the transmitting WTRU. The size of the PSCCH may gauged by the number of CCEs forming a PSCCH or a PSCCH candidate.

As used hereafter, a PSCCH, a PSCCH candidate, a PSCCH decoding candidate, a PSCCH blind decoding candidate, and a PSCCH resource may be used interchangeably and still be consistent with the examples provided herein. In addition, a sidelink transmitting WTRU, a transmitting WTRU, a sender WTRU, a sidelink Tx WTRU, a Tx WTRU, and a first WTRU may be used interchangeably and still be consistent with the examples provided herein. A sidelink receiving WTRU, a receiving WTRU, a sidelink Rx WTRU, a Rx WTRU, a recipient WTRU, and a second WTRU may be used interchangeably and still be consistent with the examples provided herein.

According to an example, a WTRU may determine the size of a PSCCH based on the SCI format or restrict the size of the PSCCH to a smaller subset. For example, all of the PSCCH(s) associated with SCI format 1 may have the size of 4 CCEs. In another example, SCI format 1 may be associated with aggregation levels of {4,8} and SCI format 2 may be associated with aggregation levels of {8,16}.

According to another example, the PSCCH candidates inside the allocated resource pool may have different sizes, or aggregation levels, and the sidelink transmitting WTRU may decide which aggregation level to be used, based on the channel measurements and link adaptation to achieve a target SNR.

According to another example, the WTRU may select the aggregation level based on the measurement of the traffic from other WTRUs and the criterion of best collision avoidance. When the WTRU selects the PSCCH aggregation level, it may select a coding rate based on the SCI size and rate matching with the number of available resource elements in the PSCCH.

The CCEs of a PSCCH may be consecutive inside the configured CORESET, and/or adjacent in frequency. According to another example, the logical indices of the CCEs of a PSCCH may be consecutive, but their physical location may be non-adjacent. The choice between adjacent CCEs or non-adjacent CCEs for PSCCH may be configured implicitly by the choice of non-interleaved or interleaved mapping of REG bundles to CCEs in the CORESET.

According to another example, a set or subset of configured PDCCH candidates may be allowed, granted, or used for PSCCH transmission. For example, a subset of PDCCH candidates in a search space may be shared between PDCCH and PSCCH, wherein the DCI size and SCI size may be aligned. In the subset of PDCCH candidates, a WTRU may monitor DCI with C-RNTI and SCI with SL-RNTI. If one of a DCI and a SCI has larger payload size, the other control information may be zero-padded. A transmitting WTRU may receive the information related to the subset of PDCCH candidates of a receiving WTRU for the sidelink transmission.

PSCCH resources may be configured through CORESETs and resource pools. In an example, the pool of resources for PSCCH may be configured semi-statically, scheduled dynamically or assigned by a mixture of these two approaches, for all sidelink users in a cell, for a group of them, or for each of them.

According to an example, the pool of resources for sidelink control channel may be configured as a common search space associated with one of CORESETs that are already configured for a downlink control channel of Uu, for example, a PDCCH. The search space configuration for the sidelink resource pool may include the monitoring occasions and the number of PSCCH candidates and their size (or aggregation level) and the associated SCI format(s). In an example, the monitoring occasions may include monitoring periodicity, monitoring offset, and the monitoring pattern inside a slot. In another solution, part of these parameters may be implicitly identified from other configured parameters. For example, the size of PSCCH candidates may be implicitly obtained based on the SCI format that is configured for the PSCCH resource pool. For example, an aggregation level of 4 may be obtained if the configured SCI format is format 1.

According to another example, part of a configured CORESET for PSCCH may be allocated by frequency allocation. This frequency allocation for PSCCH may be done during the configuration of the CORESET. According to this example, a CORESET may be configured by two sets of frequency allocation. In this case, the first set may indicate the resources for a Uu downlink control channel and the second set may indicate the resource pool for a sidelink control channel. The first set and the second set may be disjointed or may have overlap. In one example, the second set may be a subset of the first set. In the case of overlap between the two sets, the gNodeB may indicate the availability of these overlapped resources or the opposite dynamically by mechanisms such as a group-common PDCCH, transmitted in CORESET 0. The availability of these overlapped resources may involve, for example, the absence of Uu downlink control, and the opposite may involve, for example, the presence of Uu downlink control. In another variation of this example, the CORESET may be configured by one frequency allocation but with two ranges of CCEs. In a further example, one range of CCEs may be associated with the PDCCH and another range of CCEs may be associated with the PSCCH. In this method, the size of PSCCH candidates may be a fixed value L or a set of fixed values $\{L_i\}$ (based on the SCI format). Also, each PSCCH candidate may be associated with $L_i$ non-overlapping consecutive CCEs in the resource pool. For example, if CCEs 1, . . . , 16 in a configured CORESET are associated with the PSCCH and the set of PSCCH sizes is {4,8}, the PSCCH candidates may be {1,2,3,4}, {5,6,7,8}, {9,10,11,12}, {13,14,15,16}, {1,2,3,4,5,6,7,8}, {9,10,11,12,13,14,15,16}.

Figure 5:
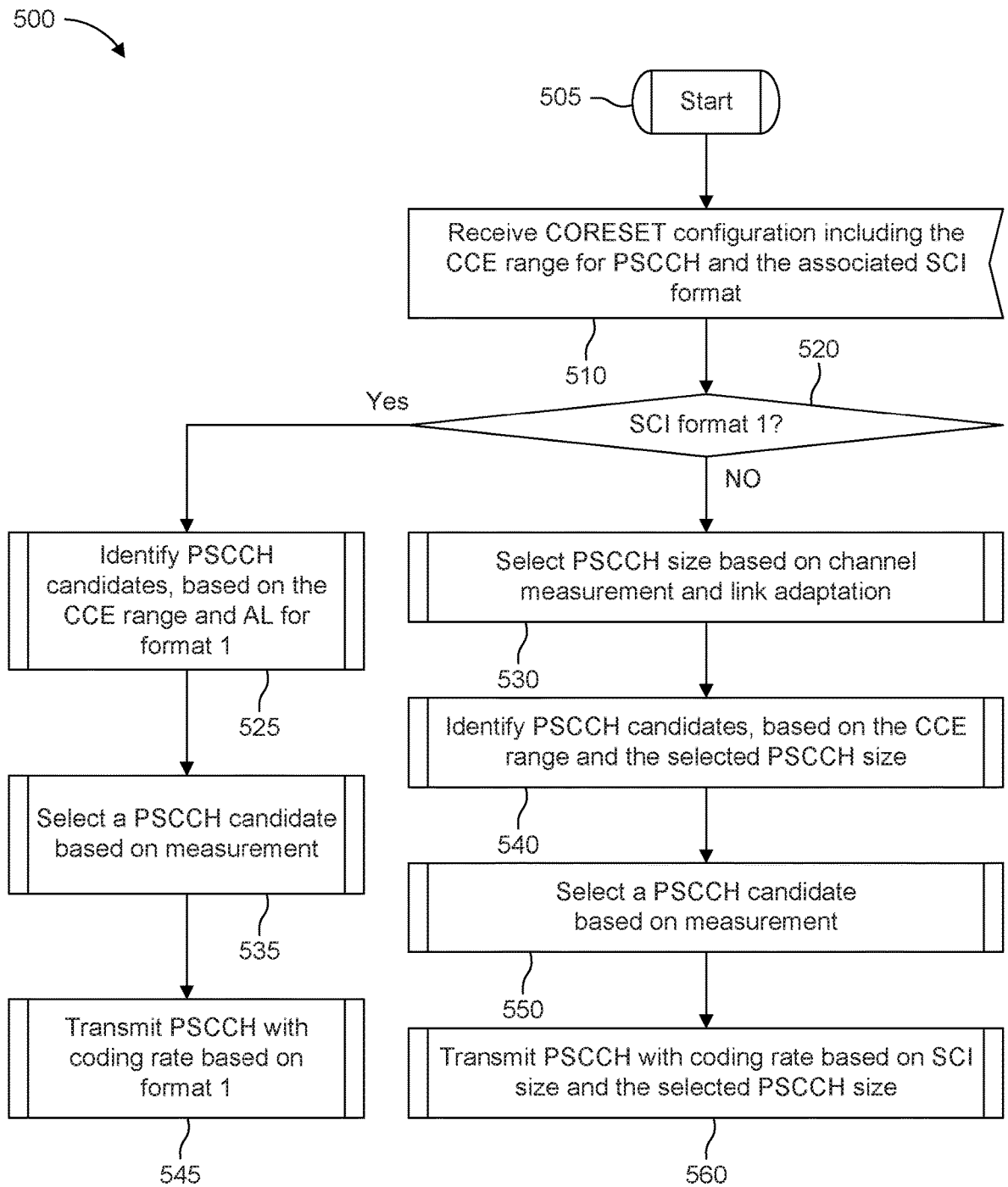
FIG. 5 is a flowchart diagram illustrating an example of a WTRU procedure for transmitting a PSCCH based on a resource pool configuration.

FIG. 5 is a flowchart diagram illustrating an example of a WTRU procedure for transmitting a PSCCH based on a resource pool configuration. As shown in flowchart diagram 500, the WTRU procedure may include the case of autonomous PSCCH scheduling. In an example, a WTRU may start 505 the procedure and receive a CORESET configuration including the CCE range for a PSCCH and the associated SCI format 510. The WTRU may then determine whether the received associated SCI format is SCI format 1 520.

If the WTRU determines that it has received SCI format 1, the WTRU may then identify PSCCH candidates based on the CCE range and AL for SCI format 1 525. The WTRU may then select a PSCCH candidate based on measurement 535. In an example, the WTRU may select the PSCCH candidate which may best minimize a collision probability. Further, the WTRU may transmit a PSCCH with a coding rate based on SCI format 1 545.

If the WTRU determines that it has not received SCI format 1, the WTRU may then select a PSCCH size based on channel measurement and link adaptation 530. Further, the WTRU may then identify PSCCH candidates based on the CCE range and the selected PSCCH size 540. Also, the WTRU may select a PSCCH candidate based on measurement 550. In an example, the WTRU may select the PSCCH candidate which may best minimize a collision probability.

Further, the WTRU may transmit a PSCCH with a coding rate based on an SCI size and the selected PSCCH size 560.

In examples, a resource subset determination may be based on a WTRU-ID. According to an example, to support unicast and multicast applications for sidelink, one approach is to utilize WTRU-IDs and/or group-IDs. In the case that WTRU-ID, group-IDs or both are defined for sidelink WTRUs and all the neighboring WTRUs know such IDs, they may be used to make unicast sidelink and multicast sidelink more efficient.

According to an example, a solution for having more efficient unicast and multicast sidelink communication may be to link WTRU-IDs and/or group-IDs to subsets of the resource pool for PSCCH, instead of the whole resource pool of PSCCH. According to this example, the active subset of the PSCCH resource pool for unicast, or multicast, may be determined as a function of the WTRU-ID, or group-ID, of the receiver WTRU. This function may be predetermined, predefined, or may be semi-statically configured by a gNB, or may be a specific function with some parameters configured by the gNB. In this solution, the transmitter WTRU may use a subset of a resource pool, based on the intended receiver(s) or receiving WTRU(s), for scheduling PSCCH and the receiving WTRU(s) may use the subset of resource pool for blind detection of PSCCH, instead of the whole resource pool. Hereafter, a WTRU-ID, C-RNTI, CS-RNTI, IMSI, System Architecture Evolution (SAE) Temporary Mobile Subscriber Identity (s-TMSI), and any RNTI assigned or configured to the WTRU may be used interchangeably and still be consistent with examples provided herein. A group-ID may be an RNTI assigned or configured for the group of WTRUs.

According to an example, a function indicating the active subset associated with a WTRU-ID, or group-ID, may be a hashing function that indicates the beginning of the PSCCH candidates. This hashing function may be the hashing function defined for Uu PDCCH in NR or LTE as a function of an RNTI.

According to another example, the function indicating the active subset associated with a WTRU-ID, or a group-ID, may be a many-to-one function based on parity or modulo operation. For example, the whole resource pool may be partitioned to two subsets and the active subset associated with a WTRU-ID, or a group-ID, may be the first or the second subset, whether it is odd or even, respectively. As used herein, a WTRU-ID may be interchangeably used with a group-ID, a source-ID, a sender-ID, a destination-ID, a receiver ID, and/or a groupcast-ID and still be consistent with examples provided herein.

In examples, a PSCCH design may be based on an NR PUCCH. According to an example, a WTRU may transmit or receive an SCI on a PUCCH resource among the dedicated pool of PUCCH resources for sidelink communication. The PUCCH resource set for sidelink transmissions can be provided by higher layer signaling. The WTRU may also be provided with a maximum number of SCI bits the WTRU can transmit using a PUCCH resource in the PUCCH resource set by a higher layer. In the context of examples provided herein, the SCI may include control scheduling information sent by the transmitting WTRU or feedback control information transmitted by the receiving WTRU. The feedback control information may include HARQ-ACK, CSI and the like. Also the PSCCH may be used interchangeably as a physical channel which carries the SCI in either direction. For example, there may be two-sided communication between two WTRUs. Based on this design principle, a unified design may be provided for a sidelink control channel to be used for carrying the sidelink control information in either communication direction.

According to an embodiment, a WTRU may share PUCCH resources between sidelink and Uu communications. The WTRU may be configured with one or more sets of PUCCH resources by a higher layer for both sidelink and Uu communication.

A WTRU may determine the PUCCH resource for sidelink communication, for a PSCCH for example, such that the WTRU may determine whether to use the PUCCH resource configured for Uu communication for sidelink transmission based on the gNB coverage where the WTRU is in-coverage or out-of-coverage. For example, when the WTRU is outside of the gNB coverage, the WTRU may select any PUCCH resource among the PUCCH resource sets configured for Uu communication for sidelink communication. When the WTRU is in the gNB coverage, the WTRU may have access to only a subset of PUCCH resource sets or a list of PUCCH resource indexes within a PUCCH resource set for sidelink communication. The list of available PUCCH resource indexes or the index(es) of the PUCCH resource set(s) for sidelink communication can be configured by a higher layer.

If a WTRU is not transmitting on the configured PUCCH resources for Uu communication in a given slot, and the WTRU is transmitting SCI, the WTRU may transmit SCI in a PUCCH resource configured for Uu communication, in an example.

The WTRU may determine whether it should use the PUCCH resources for sidelink transmission depending on the accuracy of its timing synchronization or the synchronization mechanisms available at the WTRU. The synchronization mechanisms available at the WTRU may include sidelink synchronization signals, Uu synchronization signals, GNSS, and the like. As an example, if the WTRU determines that the synchronization accuracy does not meet the V2X use-case requirement, such as a certain timing threshold, and may cause interference to other UL transmissions, the WTRU may refrain from using the PUCCH resources that are configured for Uu communication for sidelink communication. If the WTRU conducts sidelink synchronization exclusively based on the sidelink synchronization signals, GNSS or both, the WTRU may refrain from using the PUCCH resources that are configured for Uu communication. Further, if the WTRU conducts synchronization based on the synchronization signals received from the gNB, the WTRU may use the PUCCH resources that are configured for Uu communication for sidelink communication.

The WTRU may determine whether it should use the PUCCH resources for sidelink transmission or Uu transmission based on some priority rules. For example, if a WTRU needs to transmit SCI on a PUCCH resource which is expected to be used for HARQ-ACK/scheduling request (SR) and periodic/semi-persistent CSI to the gNB, or if the WTRU determines that the PUCCH resource to be used for SCI overlaps with the PUCCH resource to be used for UCI transmission, the WTRU may drop the SCI or UCI based on a pre-specified priority criterion. For example, if a WTRU is expected to transmit HARQ-ACK/SR on the PUCCH to a serving gNB, the WTRU may drop SCI and include only HARQ-ACK/SR in the PUCCH. Accordingly, in an example, the PUCCH resource may be used for Uu communication. If a WTRU is expected to transmit periodic/semi-persistent CSI on the PUCCH to a serving gNB, the WTRU may drop the periodic/semi-persistent CSI report(s)

and transmit only SCI in the PUCCH. Accordingly, in an example, the PUCCH resource may be used for sidelink communication.

Among the uplink control channel formats supported for Uu communications in NR, a WTRU may use the PUCCH resources which are configured for PUCCH formats supporting a payload which is larger than a certain threshold, for example, 2 bits, for sidelink communication, for example, PUCCH format 2, PUCCH format 3 or PUCCH format 4.

A WTRU may use a subset of PUCCH formats configured for Uu communications based on the PUCCH format associated waveform, the PUCCH length in terms of number of symbols within a slot, the PUCCH bandwidth in terms of the number of RBs or the PUCCH Format user multiplexing capability. As examples, a WTRU may only use the PUCCH resources that are associated with the short PUCCH format with one or two symbols for sidelink transmission, for example, a PSCCH. A WTRU may only use the PUCCH resources that are associated with the long PUCCH format with four or more symbols for sidelink transmission, for example, a PSCCH. Also, a WTRU may only use a PUCCH resource which is associated with a PUCCH format based on the OFDM waveform for sidelink transmission. Further, a WTRU may only use a PUCCH resource which is associated with a PUCCH format based on the DFT-s-OFDM waveform for sidelink transmission. Additionally, a WTRU may only use a PUCCH resource which is associated with a PUCCH format which can support user multiplexing on the same time-frequency resources for sidelink transmission.

A WTRU may be configured with two PSCCH resource sets by a higher layer, one for transmission of a PSCCH and one for the reception of a PSCCH. The PSCCH resource sets can be partially or fully overlapped to maximize resource usage efficiency.

According to an example, a WTRU may determine the PSCCH format, the PSCCH resource, the number of symbols within a slot and the set of RBs for PSCCH transmission based on the categories of requirements to support enhanced V2X scenarios including parameters. The V2X scenarios may include, for example, vehicles platooning, advanced driving, extented sensors, remote driving and the like. The parameters may include, for example, a payload of SCI, a maximum end-to-end latency, reliability, and/or a minimum required V2X communication range. In an example, the payload of the SCI may be provided in terms of the number of uncoded or coded bits. Further, the maximum end-to-end latency may include, for example, from the time of an SCI transmission by the transmitting WTRU until the time that the SCI is correctly detected at the receiving WTRU. Also, reliability may include, for example, an SCI block error rate of a range from 10% to 0.001%. In addition, a minimum required V2X communication range may include, for example, 50 m for short-range communications and up to 1000 m for long range communications.

According to an example, a WTRU may use a short PSCCH format with one or two OFDM symbols for V2X applications including short-range communications, for example, sensor information sharing between WTRUs, and/or low latency applications. Low latency applications may include, for example, emergency trajectory alignment between WTRUs to support advanced driving.

According to another example, a WTRU may use a long PSCCH Format with four or more OFDM symbols for V2X applications including long-range communication, for example, video sharing between WTRUs to support extended sensors, and/or high reliability applications. High reliability applications, may include, for example, information exchange between a WTRU supporting a V2X application and a V2X application server to support remote driving.

In examples, a WTRU may make sidelink control channel format/resource determinations based on an SCI format. By way of example, a WTRU may determine the PSCCH format and the corresponding PSCCH resource or resource pool according to the SCI format. For example, where an SCI format may be defined for short payloads, low latency or short range sidelink communication, the WTRU may use a short PSCCH format. Further, where an SCI format is defined for large payloads, high reliability or long-range sidelink communication, the WTRU may use a long PSCCH format.

In further examples, an adaptive scrambler initializing parameter may be used for PSCCH. According to an example, a WTRU may assume a different initializing parameter, such as, for example, a c_init, for the scrambling sequence generator for scrambling of the PSCCH payload which is adapted to a PSSCH transmission mode. In example, the PSSCH transmission mode may be unicast, group-cast or broadcast. In an example, a WTRU may determine the initializing parameter, for example, the c_init, as in one or more of the following steps. For example, if the PSSCH is for unicast, the initializing parameter, for example, the c_init, may be a function of the WTRU-ID or RNTI. Further, in an example, n_RNTI=C_RNTI. Also, if the PSSCH is for broadcast, either the initializing parameter, for example, the c_init, may not be a function of the WTRU-ID or RNTI. For example, n_RNTI=0, or no scrambling may be performed at all. If the PSSCH is for multicast, the initializing parameter, for example, the c_init, may be a function of a group ID, for example, a group RNTI.

In examples, a PSCCH design may be based on a PUSCH. A PUSCH may be used for a sidelink transmission, for example, a PSCCH or a PSSCH. The PUSCH may have variable DM-RS density based on higher layer configuration, wherein the DM-RS density may be or may include the number of DM-RS symbols used for a PUSCH or PSSCH transmission. The DM-RS density may be or may include the number of REs used for DM-RS transmission within a PSCCH or a PSSCH resource.

One or more DM-RS densities may be used, determined, or configured and each DM-RS density may be associated with the number of symbols used for DM-RS within a slot. The location of a DM-RS may be determined based on at least one of available symbols, a starting symbol of a sidelink transmission, slot structure, and/or a number of DM-RS symbols. In examples, the available symbols may be OFDM symbols, DFT-s-OFDM symbols and the like. Further, the available symbols may be for sidelink transmission within a slot. In examples, the sidelink transmission may be a PSCCH and/or a PSSCH. Further, the slot structure may include a number of downlink symbols, a number of flexible symbols, and a number of uplink symbols, in examples. Moreover, the number of DM-RS symbols may be the number of DM-RS symbols for the sidelink transmission.

Figure 6:
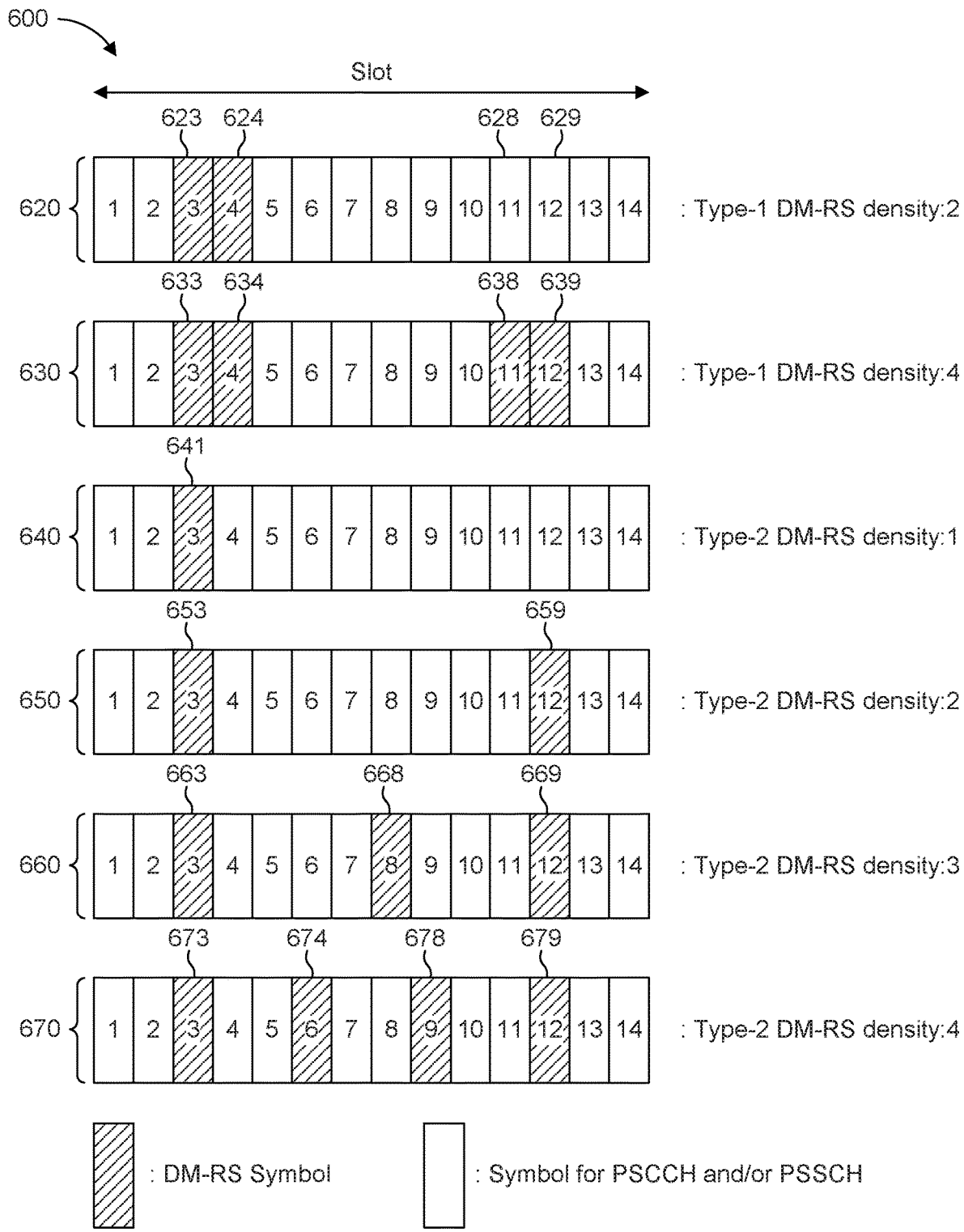
FIG. 6 is a diagram illustrating an example of demodulation reference signal (DM-RS) type and density.

FIG. 6 is a diagram illustrating an example of DM-RS type and density. One or more DM-RS types may be used, determined, or configured as shown in an example in diagram 600. As an example, a DM-RS type may be determined based on the time location of the DM-RS symbols. Further, a DM-RS density may be considered to be the number of DM-RS symbols within a slot. For example, a DM-RS density of one may mean that a slot has one DM-RS symbol, a DM-RS density of two may mean that a slot has two DM-RS symbols, a DM-RS density of three may mean that a slot has three DM-RS symbols, a DM-RS density of four may mean that a slot has four DM-RS symbols, and the like. Moreover, a DM-RS density may be used interchangeably with PTRS density and still be consistent with the examples and embodiments provided herein.

In an example, a type-1 DM-RS may include at least two DM-RS symbols located in consecutive OFDM symbols. For example, slot 620 may include DM-RS symbol 623 and DM-RS symbol 624 as consecutive OFDM symbols. Each of the other symbols in slot 620 may be a PSCCH symbol, a PSSCH symbol or both, and the same kind or a mix of these other symbols may be used in the same slot. For example, symbol 628 may be a PSCCH symbol and symbol 629 may be a PSSCH symbol. In another example, symbol 628 may be a PSSCH symbol and symbol 629 may be a PSCCH symbol. In a further example, both symbols 628, 629 may be PSCCH symbols. In an additional example, both symbols 628, 629 may be PSSCH symbols. Since DM-RS symbol 623 and DM-RS symbol 624 are consecutive OFDM symbols, slot 620 may be considered to include a type-1 DM-RS. Further, as slot 620 has two DM-RS symbols, slot 620 may be considered to have a density of two (2).

Further, slot 630 may include DM-RS symbol 633 and DM-RS symbol 634 as consecutive OFDM symbols and include DM-RS symbol 638 and DM-RS symbol 639 as consecutive OFDM symbols. Each of the other symbols in slot 630 may be a PSCCH symbol and/or a PSSCH symbol, as described above. Since DM-RS symbol 633 and DM-RS symbol 634 are consecutive OFDM symbols, and DM-RS symbol 638 and DM-RS symbol 639 are consecutive OFDM symbols, slot 630 may be considered to include a type-1 DM-RS. Further, as slot 630 has four DM-RS symbols, slot 630 may be considered to have a density of four (4).

In addition, a type-2 DM-RS may be based on distributed DM-RS symbols. Further, a type-2 DM-RS may not need to include consecutive DM-RS symbols. For example, slot 640 may include DM-RS symbol 641. Each of the other symbols in slot 640 may be a PSCCH symbol, a PSSCH symbol or both. If the next slot transmitted in time is of the same type and density, after 13 of the other symbols are transmitted, another DM-RS symbol may then be transmitted. Since the DM-RS symbols are transmitted in the same time location for each slot of the same type and density, the DM-RS symbols may be considered to be distributed. Further, as slot 640 has one DM-RS symbol, slot 640 may be considered to have a density of one (1).

Further, slot 650 may include DM-RS symbol 653 and DM-RS symbol 659. Each of the other symbols in slot 650 may be a PSCCH symbol and/or a PSSCH symbol. In an example, eight symbols may separate DM-RS symbol 653 and DM-RS symbol 659. Also, two symbols separate the beginning of the slot and DM-RS symbol 653, and two symbols separate the end of the slot and DM-RS symbol 659. As a result, the DM-RS symbols in slot 650 may be considered to be distributed. Further, as slot 650 has two DM-RS symbols, slot 650 may be considered to have a density of two (2).

Also, slot 660 may include DM-RS symbol 663, DM-RS symbol 668 and DM-RS symbol 669. Each of the other symbols in slot 660 may be a PSCCH symbol and/or a PSSCH symbol. The distance between DM-RS symbols is distributed at either three or four other symbols. For example, four other symbols separate DM-RS symbol 663 and DM-RS symbol 668. Also, three other symbols separate DM-RS symbol 668 and DM-RS symbol 669. Moreover, four other symbols separate DM-RS symbol 669 and the next DM-RS symbol in the next slot of the same type and density. Accordingly, the next DM-RS symbol would appear in symbol location 3 in the next slot. As a result, the DM-RS symbols in slot 660 may be considered to be distributed. Further, as slot 660 has three DM-RS symbols, slot 660 may be considered to have a density of three (3).

Moreover, slot 670 may include DM-RS symbol 673, DM-RS symbol 674, DM-RS symbol 678 and DM-RS symbol 679. Each of the other symbols in slot 670 may be a PSCCH symbol or a PSSCH symbol. The distance between DM-RS symbols is distributed at two other symbols. For example, two other symbols separate DM-RS symbol 673 and DM-RS symbol 674, two other symbols separate DM-RS symbol 674 and DM-RS symbol 678, and two other symbols separate DM-RS symbol 678 and DM-RS symbol 679. Also, two symbols separate the beginning of the slot and DM-RS symbol 673, and two symbols separate the end of the slot and DM-RS symbol 679. As a result, the DM-RS symbols in slot 670 may be considered to be distributed. Further, as slot 670 has four DM-RS symbols, slot 670 may be considered to have a density of four (4).

According to an example, a DM-RS density for a PSCCH and/or PSSCH transmission may be indicated from the grant for sidelink transmission. For example, a gNB may send a grant for resources for a sidelink transmission and the DM-RS density for the sidelink transmission may be indicated in the grant. The grant may be in a DCI message which may be monitored by a WTRU in a PDCCH search space. Alternatively, the grant may be signaled via a higher layer signaling, for example, via RRC signaling and/or via a MAC-control element (CE). The grant may provide one or more sidelink resources in a resource pool and/or may provide a group-ID or WTRU-ID.

According to another example, a DM-RS density for a PSCCH/PSSCH transmission may be determined based on at least one of: a range, or coverage, for sidelink transmission; a repetition level determined for PSCCH transmission, PSSCH transmission, or both; a retransmission number for a PSSCH or a number of HARQ-ACK; a transmission power level; a number of RBs, or number of subchannels, scheduled for sidelink transmission; a QoS; a CBR of a resource pool; a relative speed for a sidelink channel; an SCI format; a subcarrier spacing; a sidelink resource location, for example, in time, frequency or both, within a resource pool; a sidelink resource index within a resource pool; and/or a number of symbols used for a PSCCH or a PSSCH transmission. In an example, the range may refer to the minimum required communication range of a sidelink packet to be transmitted. In a further example, coverage may refer to a device being in-coverage or out-of-coverage. The retransmission number for a PSSCH may be utilized such that a first DM-RS density may be used for a first PSSCH transmission and a second DM-RS density may be used for a second PSSCH transmission. A transmission power level may include an offset level from the maximum transmission power. In a further example, if the transmission power level is within a range from the peak transmission power, for example, Pc,max, a WTRU may use a first DM-RS density for a PSCCH, or PSSCH, transmission. Otherwise, the WTRU may use a second DM-RS density for a PSCCH, or PSSCH, transmission. In an example, an SCI format may be associated with a sidelink channel transmission or reception. In a further example, a first DM-RS density may be used when transmission or reception of a sidelink channel is associated with a first SCI format, for example, format 0, and a second DM-RS density may be used when transmission or reception of a sidelink channel is associated with a second SCI format, for example, format 1. In another example, a first DM-RS density may be used when a CBR is higher than a threshold, and a second DM-RS density may be used when the CBR is lower than or equal to the threshold, wherein the threshold may be determined based on at least one of QoS, coverage, a retransmission number, and a transmission power level.

According to another example, a first WTRU, for example, a receiving WTRU, may request a DM-RS density for subsequent sidelink transmission, for example, a PSCCH or a PSSCH. In an example, the WTRU may request a preferred DM-RS density. The request may be made to a gNB or a second WTRU, for example, a transmitting WTRU. The gNB or second WTRU may acknowledge the request, may indicate, for example, to the first WTRU, a DM-RS density, for example, a new or updated DM-RS density, and/or may change the DM-RS density for transmission, for example, based on the received request.

Examples of DM-RS density adaptation without CSI are disclosed herein. A source WTRU may or may not have CSI for the sidelink channel, or a subchannel, between the source WTRU and a destination WTRU. In the case that a source WTRU may not have the CSI even though the destination WTRU reported a negative acknowledgement (NACK), a simple retransmission may not recover the erroneous transmission since the error may have occurred due to a lack of DM-RS density which results in bad channel estimation.

According to an example, a DM-RS density for a sidelink transmission, for example, a PSCCH transmission, a PSSCH transmission or both, for unicast traffic may be determined based on the retransmission number or redundancy version number, wherein a destination WTRU may indicate HARQ-ACK and/or HARQ-NACK to a source WTRU. In examples, a destination WTRU may be a receiver WTRU and a source WTRU may be a transmit WTRU.

One or more DM-RS densities, DM-RS types, or both, may be used and each DM-RS density and/or type may be associated with a retransmission number or redundancy version number. The retransmission number or redundancy version number may be counted by source WTRU(s) and destination WTRU(s). The destination WTRU or receiver WTRU may determine the DM-RS density for a sidelink channel reception based on the counted number of retransmissions or redundancy version number.

Figure 7:
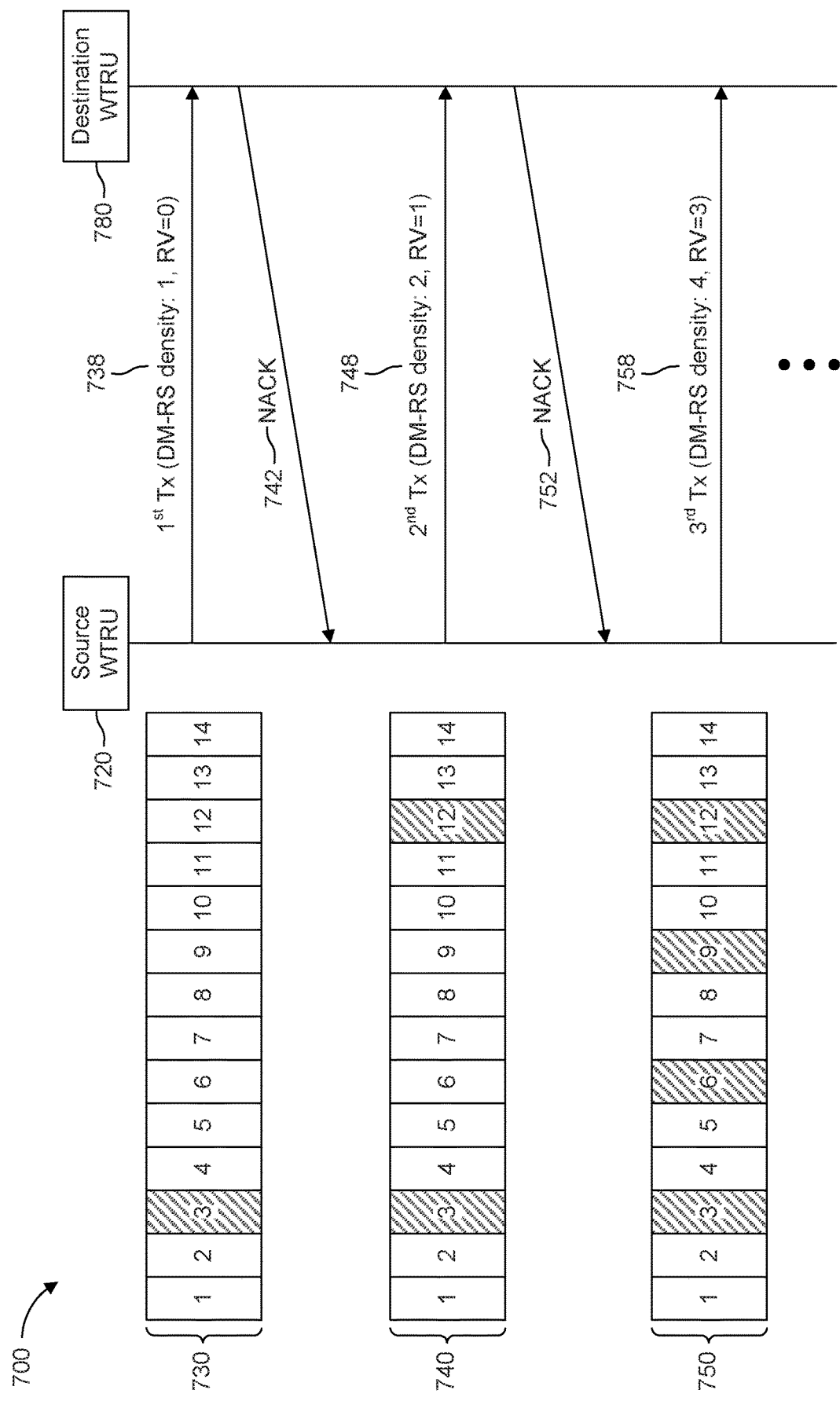
FIG. 7 is a diagram illustrating an example of DM-RS density determination based on a redundancy version number.

FIG. 7 is a diagram illustrating an example of DM-RS density determination based on a redundancy version number. In an example shown in diagram 700, a source WTRU 720 may send one or more transmissions to a destination WTRU 780. The transmissions may be type-2 DM-RS transmissions. In an example, the type-2 DM-RS transmissions may be as described elsewhere herein. For example, the source WTRU 720 may prepare a type-2 DM-RS transmission 730 with a DM-RS density of one (1). Accordingly, the source WTRU 720 may transmit a first transmission 738 to the destination WTRU 780 at a DM-RS density of 1 and a redundancy version number of zero (0). The destination WTRU 780 may not successfully receive the first transmission 738, and as a result, may transmit a NACK 742 to the source WTRU 720. Consequently, the source WTRU 720 may prepare a type-2 DM-RS retransmission 740 to the destination WTRU 780 and increment the redundancy version number to two (2). Based on the increased redundancy version number, the source WTRU 720 may also determine an increased DM-RS density. Accordingly, based on the redundancy version number of 2, the source WTRU 720 may determine an increased DM-RS density of two (2) for the retransmission 740. In this way, source WTRU 720 may transmit the retransmission 740 as a second transmission 748 to the destination WTRU 780 at a DM-RS density of 2 and a redundancy version number of 2.

Further, the destination WTRU 780 may also not successfully receive the second transmission 748, and as a result, may transmit another NACK 752 to the source WTRU 720. Accordingly, the source WTRU 720 may prepare a further type-2 DM-RS retransmission 750 to the destination WTRU 780 and increment the redundancy version number further to three (3). Further, based on the redundancy version number of 3, the source WTRU 720 may determine an increased DM-RS density of four (4). Therefore, source WTRU 720 may transmit the further retransmission 750 as a third transmission 758 to the destination WTRU 780 at a DM-RS density of 4 and a redundancy version number of 3.

The destination WTRU 780 may then successfully receive the third transmission 758, in an example. In another example, the destination WTRU 780 may then not successfully receive the third transmission 758, and may further continue the process described above in coordination with the source WTRU 720. The process described above may continue until the destination WTRU 780 successfully receives a transmission from the source WTRU 720 or another event occurs, such as a timer expires, a control signal is received by the destination WTRU 780, or the like.

One or more DM-RS densities, DM-RS types, or both, may be used, configured, or preconfigured; and each DM-RS density, DM-RS types, or both may be associated with a redundancy version number. The association between DM-RS density and redundancy version number may be predefined, preconfigured, or configured. The association between DM-RS density and redundancy version number may be configured, or determined based on a resource pool, a resource pool ID, or a resource ID within a resource pool.

Figure 8:
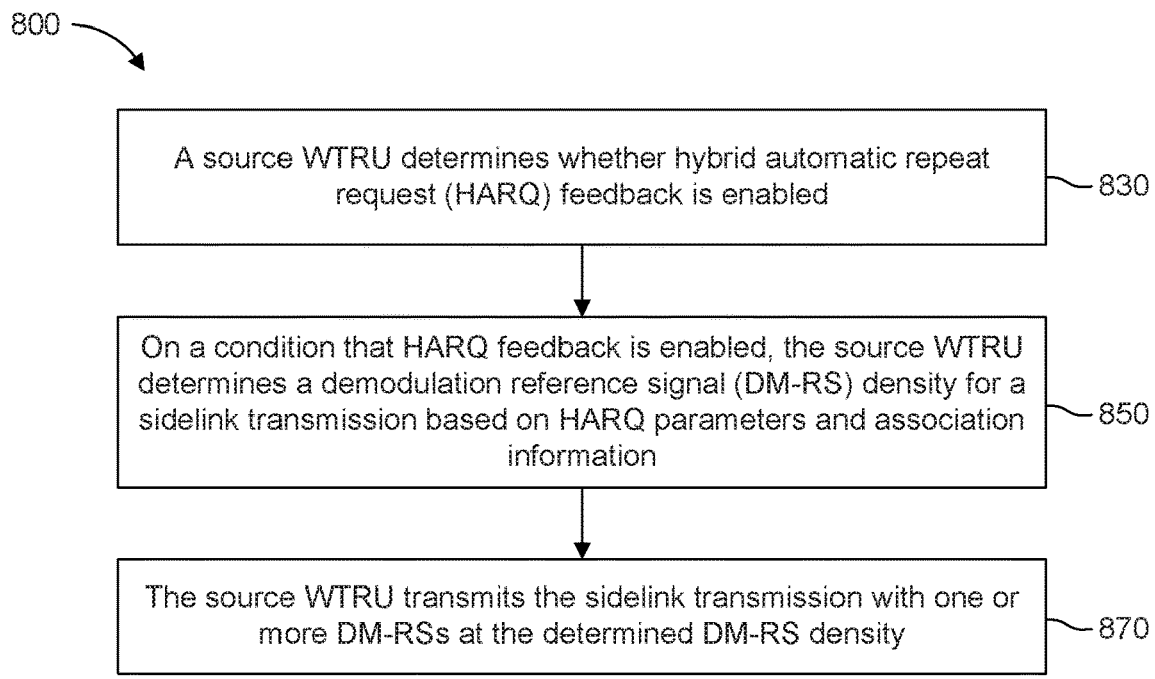
FIG. 8 is a flowchart diagram illustrating an example of DM-RS density determination based on one or more hybrid automatic repeat request (HARQ) parameters.

FIG. 8 is a flowchart diagram illustrating an example of DM-RS density determination based on one or more HARQ parameters. In an example shown in flowchart diagram 800, a WTRU may determine whether HARQ feedback is enabled 830. The WTRU may be a source WTRU, in an example. In another example, the WTRU may be a transmitting WTRU. Further, on a condition that HARQ feedback is enabled, the WTRU may determine a DM-RS density for a sidelink transmission based on HARQ parameters and association information 850. The WTRU may then transmit the sidelink transmission with one or more DM-RSs at the determined DM-RS density 870.

Figure 9:
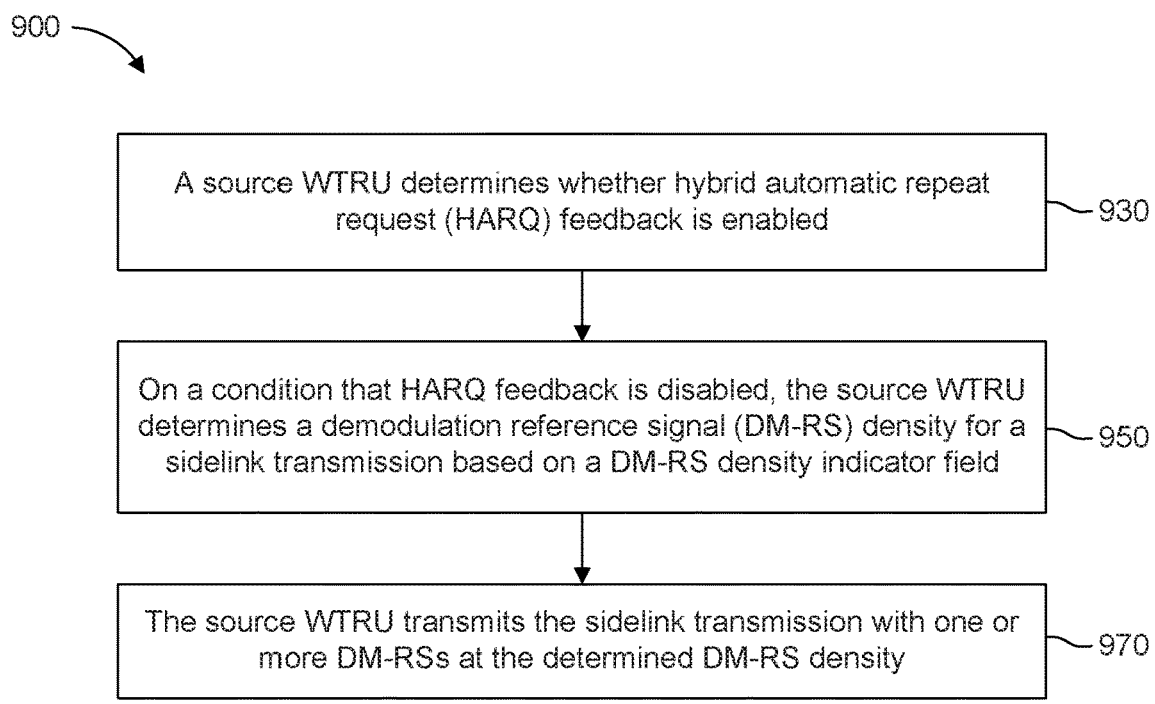
FIG. 9 is a diagram illustrating an example of DM-RS density determination based on a DM-RS density indicator field.

FIG. 9. is a flowchart diagram illustrating an example of DM-RS density determination based on one or more HARQ parameters. In an example shown in flowchart diagram 900, a WTRU may determine whether HARQ feedback is enabled 930. The WTRU may be a source WTRU, in an example. In another example, the WTRU may be a transmitting WTRU. Further, on a condition that HARQ feedback is disabled, the WTRU may determine a DM-RS density for a sidelink transmission based on a DM-RS density indicator field 950. The WTRU may then transmit the sidelink transmission with one or more DM-RSs at the determined DM-RS density 970.

In an example, the WTRU may be configured or preconfigured with one or more DM-RS time densities for sidelink transmission. In a further example, the DM-RS density indicator field may be received by the WTRU in associated SCI. Also, the association information may be predetermined, in an example.

Also, in an example, the association information may include information regarding an association between configured DM-RS time densities and the HARQ parameters. In a further example, the association information may be received by the WTRU. In an example, the association information may be received via an RRC message. In another example, the association information may be received in associated SCI. Further, the association information may be an indication, in an example. In a further example, the association information may be an index.

In an additional example, the HARQ parameters may include one or more of a redundancy version number, a new data indicator (NDI) bit toggle status, a HARQ retransmission number or a HARQ process number. Further, the HARQ parameters may be received in associated SCI.

In a further example, the WTRU may transmit the sidelink transmission to a destination WTRU. In another example, the WTRU may transmit the sidelink transmission to a receiving WTRU. In an additional example, the sidelink transmission may be a PSCCH. Further, the sidelink transmission may be a PSSCH, in an example.

The DM-RS density may be determined based on retransmission number, redundancy version number, or both if CSI feedback is disabled. If CSI feedback is enabled, the DM-RS density may be indicated based on at least one of a DM-RS density indication field in the associated SCI, an MCS level of the associated PSSCH, a QoS, a traffic type and the like.

The DM-RS density may be determined based on a new data indicator (NDI) status, a HARQ process number, or both. For example, for a given HARQ process number, if an NDI bit is toggled from the initial transmission, a first DM-RS density may be used. In examples, the NDI bit may be toggled from 1 to 0, or from 0 to 1. If the NDI bit is not toggled from the initial transmission, a second DM-RS density may be used.

The DM-RS density may be determined based on a HARQ related parameter, wherein the HARQ related parameter includes at least one of redundancy version number, NDI bit toggle status, HARQ process ID, and the like.

According to an example, a DM-RS density for a sidelink transmission, for example, a PSCCH transmission, a PSSCH transmission, or both, may be determined based on a resource ID or a resource pool ID). One or more resource pools may be used and each resource pool may include one or more sub-channels. Each subchannel may be associated with a resource ID.

For each sub-channel or resource pool, the DM-RS density may be configured. A WTRU may determine a DM-RS density based on resource ID, resource pool ID, or both, which may be associated with a sidelink transmission. A source WTRU may select a sub-channel, a resource pool or both based on DM-RS density required. For example, a source WTRU may measure, estimate, or determine a channel condition, for example, Doppler frequency, signal-to-interference-and-noise ratio (SINR), and the like, of the sidelink channel between the source WTRU and the destination WTRU, and determine a DM-RS density based on the channel condition. Then, the source WTRU may select a sub-channel, a resource pool, or both, based on the determined DM-RS density. A destination WTRU may monitor sub-channels, a PSCCH, and/or a resource pool which may be associated with the minimum DM-RS density required to receive a sidelink transmission based on the channel condition of the sidelink between the source WTRU and the destination WTRU. As previously stated, in examples, a destination WTRU may be a receiver WTRU and a source WTRU may be a transmit WTRU.

According to an example, a DM-RS density may be indicated in an associated SCI, such that the DM-RS density indication field in the SCI may be present based on an SCI format, a sidelink traffic type, a QoS, a resource-ID, and/or a resource pool-ID. In an example, the sidelink traffic type may be broadcast, groupcast or unicast. In a further example, the QoS may include priority, reliability, or both. One or more SCI formats may be used and the DM-RS density indicator field may be present for a subset of SCI formats. In an example, the SCI format may be an SCI format for unicast traffic.

The DM-RS density indication field in the SCI may be present based on an RNTI associated with the SCI. For example, a DM-RS density indication field may be present for a first RNTI type, for example, a unicast RNTI, and the DM-RS density indication may not be present for a second RNTI type, for example, a broadcast RNTI.

The DM-RS density indication field in the SCI may be present based on a range parameter which may be used to indicate the requirement of delay, reliability, and data rate for a groupcast transmission.

The DM-RS density indication field in the SCI may be present based on whether HARQ feedback is enabled or disabled. For example, a DM-RS density indication field may be present in the associated SCI if the HARQ feedback is enabled. In a further example, the DM-RS density indication field may be present in the associated SCI if the HARQ feedback is disabled. Otherwise, the DM-RS density indication field may not be present. In an example, if HARQ feedback is disabled, the DM-RS density may be determined based on a higher layer configuration for the sidelink BWP.

According to an example, if a HARQ feedback or indication for a sidelink transmission is enabled, the DM-RS density may be determined based on a redundancy version indication for a sidelink transmission. If a HARQ feedback or indication to a source WTRU is disabled, the DM-RS density may be indicated in a DM-RS density indication field in the DCI. According to this example, a DM-RS density field may not be present when HARQ feedback is enabled and/or a DM-RS density is determined based on a redundancy version when HARQ feedback is enabled. Otherwise, DM-RS density is determined based on another mechanism described elsewhere herein. In examples, the other mechanism may include one or more of a DM-RS density indication field, an RNTI, a range parameter, higher layer signaling, a traffic type, and the like.

According to an example, multiple stage SCI may be used, such that a first SCI may provide decoding information for a second SCI, and the second SCI may include scheduling information of an associated PSSCH. The first SCI may include DM-RS density information for the associated PSSCH.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for use in a wireless transmit receive unit (WTRU) for sidelink communication, the method comprising:
   receiving a resource pool identity (ID);
   based on a determination to include information related to demodulation reference signal (DM-RS) density for a physical sidelink shared channel (PSSCH) transmission in sidelink control information (SCI), transmitting the SCI including the information related to DM-RS density, wherein the determination is based on the resource pool ID, and wherein the SCI is associated with the PSSCH transmission; and
   transmitting the PSSCH transmission with one or more DM-RSs at a first DM-RS density based on the information related to DM-RS density.

2. The method of claim 1, wherein the information related to DM-RS density indicates a number of symbols used for the one or more DM-RSs.

3. The method of claim 1, wherein the information related to DM-RS density includes a DM-RS density indicator field.

4. The method of claim 1, wherein the WTRU is a source WTRU.

5. The method of claim 1, wherein the SCI is transmitted via a radio resource control (RRC) message.

6. The method of claim 1, wherein the information related to DM-RS density includes information related to DM-RS time density.

7. The method of claim 1, wherein the information related to DM-RS density is predetermined.

8. The method of claim 1, further comprising:
   determining that hybrid automatic repeat request (HARQ) is enabled; and
   based on the determination that HARQ is enabled, determining a second DM-RS density.

9. The method of claim 8, wherein the second DM-RS density is associated with HARQ parameters, and wherein the HARQ parameters include one or more of a redundancy version number, a new data indicator (NDI) bit toggle status, a HARQ retransmission number or a HARQ process number.

10. A wireless transmit receive unit (WTRU) for sidelink communication, the WTRU comprising:
    a transceiver; and
    a processor operatively coupled to the transceiver; wherein:
        the transceiver is configured to receive a resource pool identity (ID);
        the processor and the transceiver are configured to transmit, based on a determination to include information related to demodulation reference signal (DM-RS) density for a physical sidelink shared channel (PSSCH) transmission in sidelink control information (SCI), the SCI including the information related to DM-RS density, wherein the determination is based on the resource pool ID, and wherein the SCI is associated with the PSSCH transmission; and
        the processor and the transceiver are configured to transmit the PSSCH transmission with one or more DM-RSs at a first DM-RS density based on the information related to DM-RS density.

11. WTRU of claim 10,
    wherein the information related to DM-RS density indicates a number of symbols used for the one or more DM-RSs.

12. The WTRU of claim 10, wherein the information related to DM-RS density includes a DM-RS density indicator field.

13. The WTRU of claim 10, wherein the WTRU is a source WTRU.

14. The WTRU of claim 13, wherein the SCI is transmitted via a radio resource control (RRC) message.

15. The WTRU of claim 10, wherein the information related to DM-RS density includes information related to DM-RS time density.

16. The WTRU of claim 10, wherein the information related to DM-RS density is predetermined.

17. The WTRU of claim 10, wherein the processor is further configured to determine that hybrid automatic repeat request (HARQ) is enabled; and wherein the processor is further configured to determine a second DM-RS density based on the determination that HARQ is enabled.

18. The WTRU of claim 17, wherein the second DM-RS density is associated with HARQ parameters, and wherein the HARQ parameters include one or more of a redundancy version number, a new data indicator (NDI) bit toggle status, a HARQ retransmission number or a HARQ process number.

19. The method of claim 9, further comprising:
    transmitting HARQ information with one or more DM-RSs at the second DM-RS density, wherein the HARQ parameters are received in associated SCI.

20. The WTRU of claim 18, wherein the processor and the transceiver are further configured to transmit HARQ information with one or more DM-RSs at the second DM-RS density, wherein the HARQ parameters are received in associated SCI.

* * * * *